(12) United States Patent
Hamon

(10) Patent No.: US 12,252,936 B2
(45) Date of Patent: Mar. 18, 2025

(54) BUILDING LADDER HOIST

(71) Applicant: MulePro Industries LLC, Benbrook, TX (US)

(72) Inventor: Richard A. Hamon, Benbrook, TX (US)

(73) Assignee: MulePro Industries, LLC, Benbrook, TX (US)

(*) Notice: Subject to any disclaimer, the term of this patent is extended or adjusted under 35 U.S.C. 154(b) by 319 days.

(21) Appl. No.: 17/883,110

(22) Filed: Aug. 8, 2022

(65) Prior Publication Data

US 2023/0203888 A1 Jun. 29, 2023

Related U.S. Application Data

(60) Provisional application No. 63/319,713, filed on Mar. 14, 2022, provisional application No. 63/294,600, filed on Dec. 29, 2021.

(51) Int. Cl.
*E06C 7/12* (2006.01)
*B62B 1/14* (2006.01)
(Continued)

(52) U.S. Cl.
CPC ............. *E06C 7/12* (2013.01); *B62B 1/14* (2013.01); *B62B 5/0023* (2013.01); *B62B 5/06* (2013.01);
(Continued)

(58) Field of Classification Search
CPC . E06C 7/12; E06C 7/16; B62B 5/0023; B62B 2202/24; B66D 1/00; B66D 1/28;
(Continued)

(56) References Cited

U.S. PATENT DOCUMENTS 2,576,755 A * 11/1951 Gaskins ................... A62B 1/00
182/235
2,856,018 A * 10/1958 Fegel ................... B62B 5/0023
280/30
(Continued)

FOREIGN PATENT DOCUMENTS

AT 9638 U1 * 1/2008
FR 2658804 A1 * 8/1991
(Continued)

OTHER PUBLICATIONS

Internet Advertisement from unknown date, located on Google Shopping.
(Continued)

*Primary Examiner* — Michael R Mansen
*Assistant Examiner* — Henrix Soto
(74) *Attorney, Agent, or Firm* — James E. Walton

(57) ABSTRACT

A carrier building ladder hoist that contains a removable carrier casing and a winch casing allowing a user to hoist items. The ladder hoist contains a padded back and straps to allow an individual to carry it on their back and wheels and a tow handle to allow the user to tow it behind them. The side surfaces of the winch casing in ladder hoist have grooves in them to allow a user to hook the ladder hoist to a ladder. The ladder hoist has a winch system using gears and a winch strap ending in a hook.

16 Claims, 29 Drawing Sheets

(51) Int. Cl.
*B62B 5/00* (2006.01)
*B62B 5/06* (2006.01)
*B66D 1/60* (2006.01)

(52) U.S. Cl.
CPC ............ *B66D 1/60* (2013.01); *B62B 2203/00* (2013.01); *B62B 2206/006* (2013.01); *B66D 2700/0116* (2013.01)

(58) Field of Classification Search
CPC ... B66D 1/60; B66D 3/00; B66D 3/26; B66D 2700/0183; B66B 9/16; B66B 9/187
USPC ........................................................ 254/380
See application file for complete search history.

(56) References Cited

U.S. PATENT DOCUMENTS

| | | | | |
|---|---|---|---|---|
| 3,827,707 | A * | 8/1974 | Bierman | B62B 1/125 280/654 |
| 3,885,722 | A * | 5/1975 | Robertson | A45F 3/08 224/264 |
| 3,915,432 | A * | 10/1975 | Bustamante | B66D 5/04 182/240 |
| 3,998,476 | A * | 12/1976 | Kazmark, Sr. | B62B 1/125 280/655 |
| 4,145,028 | A * | 3/1979 | Kelley | B66D 1/00 242/404.1 |
| 4,253,716 | A | 3/1981 | Turner, Jr. | |
| 4,438,764 | A | 3/1984 | Eppolito | |
| 4,614,331 | A | 9/1986 | Simon | |
| 4,623,124 | A * | 11/1986 | Lewis | B66D 1/00 254/350 |
| 4,688,657 | A * | 8/1987 | Erickson | A62B 1/00 182/7 |
| 4,694,934 | A * | 9/1987 | Erickson | A01M 31/02 182/7 |
| 4,917,401 | A * | 4/1990 | Iwaki | B62B 1/125 280/655 |
| D320,879 | S * | 10/1991 | Tsai | |
| 5,396,885 | A | 3/1995 | Nelson | |
| 5,419,569 | A | 5/1995 | Walla | |
| 5,431,428 | A * | 7/1995 | Marchwiak | A45C 13/262 280/37 |
| 5,447,216 | A | 9/1995 | Freyvogel | |
| 5,474,278 | A * | 12/1995 | Cleveland | B66D 1/08 254/358 |
| 5,769,431 | A | 6/1998 | Cordova | |
| 5,803,694 | A * | 9/1998 | Steele | B66D 1/605 414/23 |
| 5,829,585 | A | 11/1998 | Kao et al. | |
| 5,947,351 | A | 9/1999 | Garofalo et al. | |
| 6,070,888 | A * | 6/2000 | Wang | A45C 13/262 280/37 |
| 6,499,610 | B2 * | 12/2002 | Spitsbergen | B66C 23/44 212/270 |
| 6,945,438 | B1 | 9/2005 | Shih et al. | |
| 7,438,084 | B2 | 10/2008 | Trettin et al. | |
| 7,913,978 | B1 * | 3/2011 | Trihey | B66D 3/006 254/323 |
| 7,942,429 | B2 | 5/2011 | Hill | |
| 8,035,525 | B2 | 10/2011 | Noonchester | |
| 8,262,108 | B2 | 9/2012 | Al-Hasan | |
| 8,641,056 | B1 * | 2/2014 | Carter | B62B 1/26 280/30 |
| 10,421,651 | B1 * | 9/2019 | Coleman | B66D 3/26 |
| 10,683,199 | B2 | 6/2020 | Stumpf | |
| 10,738,533 | B2 | 8/2020 | Weyrauch et al. | |
| 11,317,700 | B2 | 5/2022 | Boyd | |
| 11,882,922 | B2 | 1/2024 | Joko et al. | |
| 11,897,533 | B2 | 2/2024 | Bradley et al. | |
| 12,012,140 | B2 | 6/2024 | Marchal et al. | |
| 2003/0019689 | A1 * | 1/2003 | Dorsett | E06C 7/12 182/129 |
| 2005/0017467 | A1 * | 1/2005 | Edwards | B62B 1/125 280/37 |
| 2005/0230340 | A1 * | 10/2005 | Barger, Sr. | B66C 23/44 212/280 |
| 2006/0226619 | A1 * | 10/2006 | Sadow | B62B 1/125 280/47.26 |
| 2006/0261567 | A1 | 11/2006 | Knox et al. | |
| 2009/0229914 | A1 | 9/2009 | Liles | |
| 2011/0264014 | A1 * | 10/2011 | Angold | B66D 3/18 212/255 |
| 2013/0213920 | A1 | 8/2013 | Oliver et al. | |
| 2014/0084229 | A1 * | 3/2014 | Morrison | B66D 3/006 254/344 |
| 2015/0251680 | A1 * | 9/2015 | Carter | B62B 1/12 280/30 |
| 2019/0233266 | A1 * | 8/2019 | Delaney | E06C 1/38 |

FOREIGN PATENT DOCUMENTS

| | | | | |
|---|---|---|---|---|
| GB | 2216862 | A * | 10/1989 | ............... B66D 1/06 |
| JP | 2019094145 | A * | 6/2019 | ............. B25J 11/00 |
| KR | 101500525 | B1 * | 3/2015 | |
| SE | 443555 | B * | 3/1986 | |
| WO | WO-0135736 | A1 * | 5/2001 | ............. A01K 61/60 |
| WO | WO-2019102078 | A1 * | 5/2019 | ........... B66C 23/203 |

OTHER PUBLICATIONS

Office Action dated Sep. 28, 2023 from U.S. Appl. No. 17/869,651.
Office Action dated Oct. 12, 2023 from U.S. Appl. No. 17/869,651.
Office Action dated Mar. 13, 2024 from U.S. Appl. No. 17/869,651.
International Search Report dated Apr. 18, 2023 from International Appl. No. PCT/US2022/049659.
International Preliminary Report on Patentability dated Jun. 20, 2024 from International Appl. No. PCT/US2022/049659.
Amendment dated Jun. 13, 2024 from U.S. Appl. No. 17/869,651.
Notice of Allowance dated Jul. 31, 2024 from U.S. Appl. No. 17/869,651.

* cited by examiner

BUILDING LADDER HOIST

This application claims the benefit of U.S. Provisional Application No. 63/319,713 filed on 14 Mar. 2022, titled "Safe Military-MulePro Building Ladder Hoist;" and U.S. Provisional Application No. 63/294,600 filed on 29 Dec. 2021, titled "Safe Military-MulePro Building Ladder Hoist;" which are incorporated herein in their entirety for all purposes.

BACKGROUND

1. Field of the Invention

The present application relates to ladder hoists. In particular, the present application relates to ladder hoists that can be carried by the user which have a hand crank.

2. Description of Related Art

It is common that buildings contain air conditioning, heating, and refrigeration equipment outside on top of the roof of the buildings themselves. Also, not every building has an easy access to allow users, such as commercial and industrial technicians, to get up onto the roof. Some have stairs, externally located building side ladders, internal building ladders that lead up through roof hatches, and some have no roof access stairs or ladders at all. This creates the present problem when the equipment on the roof needs maintenance or repair and the tools and equipment needed to repair them have to be physically transported up onto the roof and to the equipment. There might also be situations where firefighters, paramedics, police, or other individuals might need to bring equipment onto the roof as well and they will face the same hardships. The overall safety and physical strain put on the user when getting the tools and equipment up onto and off of the top of the roof and to the equipment is the main concern here. At the moment with the prior art, a user can only get the equipment up onto and off of the roof of a building by either dangerously single handedly carrying the equipment up and down the ladders and stairs of a building, or by dangerously tying a rope to the equipment with no known or secure place to connect the rope to on the roof.

At times an individual user will have to take multiple trips up and down ladders or stairs given the large number of tools and other equipment needed in order to repair this type of equipment on roofs. This creates an even more significant amount of danger and physical stress to the user as the individual has to climb and descend the ladder or stairs multiple times while carrying the heavy equipment. The strain comes from the individual user climbing the ladder with heavy equipment and with bringing the heavy equipment to the location itself. Individual users will typically use one hand to carry their tools or bags from their vehicle all the way up the ladder which leaves an uneven strain on the individual. This puts more strain on one side of the body over the other and the individual will deal with pain over time because of this. Also, not every roof has locations where a user can safely and securely attach a rope to the roof and the object they wish to hoist. Without this security there is a chance the objects might not make it onto the roof and could become undone in transit which could be catastrophic.

The safety and physical stress of the individuals while working on these projects should be preserved but the current method of carrying up the equipment as the person single handedly goes up a ladder or stairs, or roping up the heavy equipment with no known secure place to connect a rope or rope clip to, and then when on the roof having to hand carry all the equipment and tools to the unit does not preserve this. There have been some improvements to this by using ropes or hoisting systems to lift the equipment as this will decrease the safety risk. However, there are still numerous concerns on the safety and physical strain that is put on the individuals in this work.

Although there are some methods of carrying equipment to job sites that require the use of ladders and multiple dollies, many shortcomings still remain.

BRIEF DESCRIPTION OF THE DRAWINGS

The novel features believed characteristic of the present application are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Figure 1:
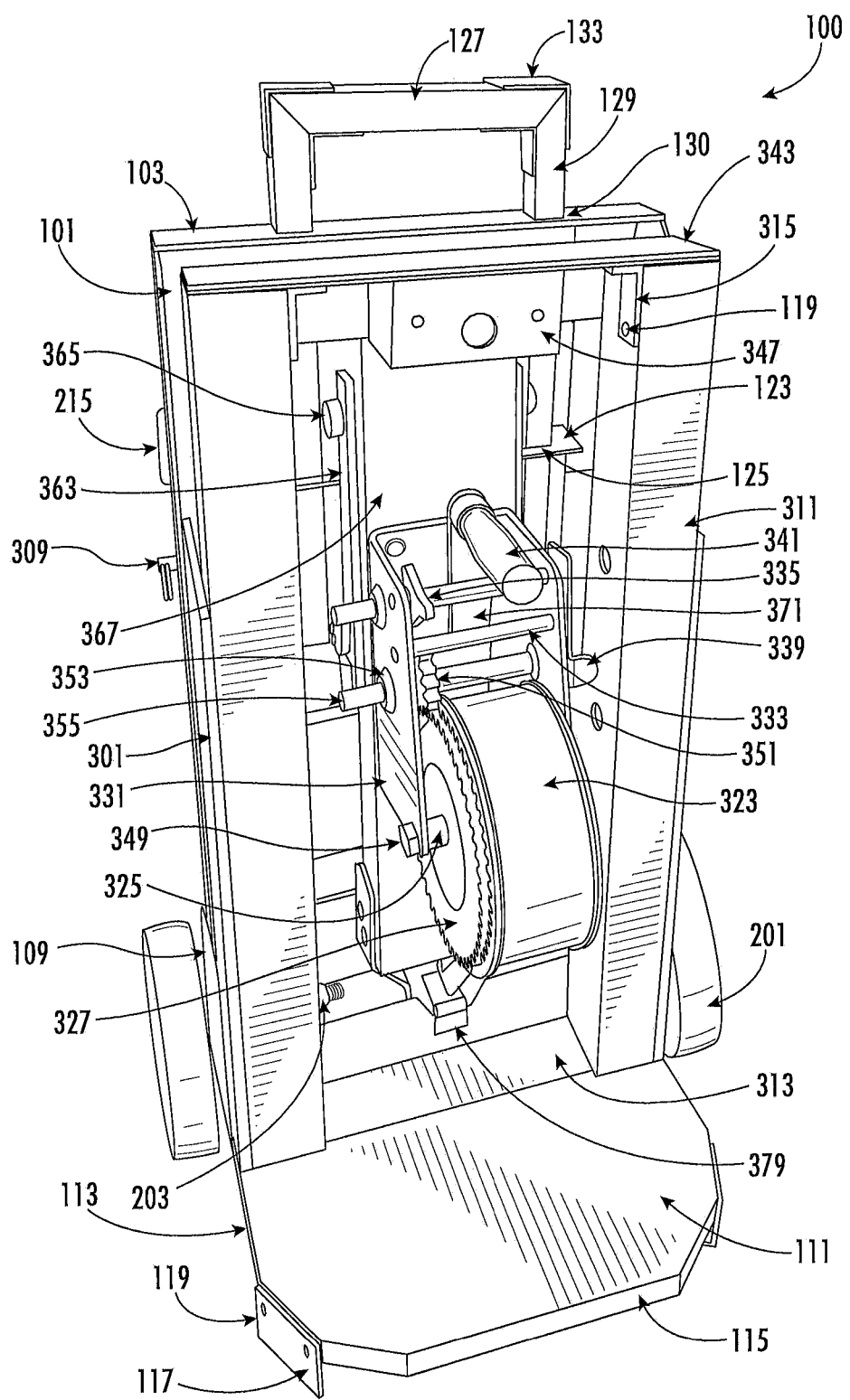
FIG. 1 is a perspective front view of the building ladder hoist, according to the present application.

Referring now to FIG. 1 in the drawings, the building ladder hoist 100 is illustrated. The structure of building ladder hoist 100 is split between removable dolly carrier/casing 200 and winch casing 300. FIG. 1 shows that removable dolly carrier/casing 200 comprises side walls 101, top plate 103, side supports 109, dolly base 111, dolly side wall 113, segmented dolly front wall 115, support tab 117, fasteners 119, supports 123, supports slot 125, handle 127, handle bars 129, handle supports 133, wheels 201, axles 203, and security strap 215. FIG. 1 shows that the winch casing 300 comprises side plate 301, fastener pin 309, end walls 311, base plate 313, side supports 315, winch strap 323, winch axle 325, main winch gear 327, winch outer plate 329, winch base 331, winch support bar 333, outer winch gear 335, rotational security bar 339, winch handle 341, upper top plate 343, lower top plate 345, support box 347, axle fastener 349, inner winch gear 351, winch handle tab base 353, winch handle tab 355, boom support bar 363, boom safety stop fasteners 365, boom 367, winch handle bar 371, and boom security tab 379. FIG. 1 shows how removable dolly carrier/casing 200 and winch casing 300 will be enjoined together in a way that will be easy for an individual to tow building ladder hoist 100 in its entirety. It is important that an individual will be able to swiftly and efficiently set up this equipment which is why winch casing 300 is designed to be easily disengaged from removable dolly carrier/casing 200. This allows the user to slide winch casing 300 off of carrier casing 200 which allows the user to easily and quickly get the dolly carrier/casing 200 and straps out of the way so winch hoist 300 can be easily installed on a building ladder.

Figure 2:
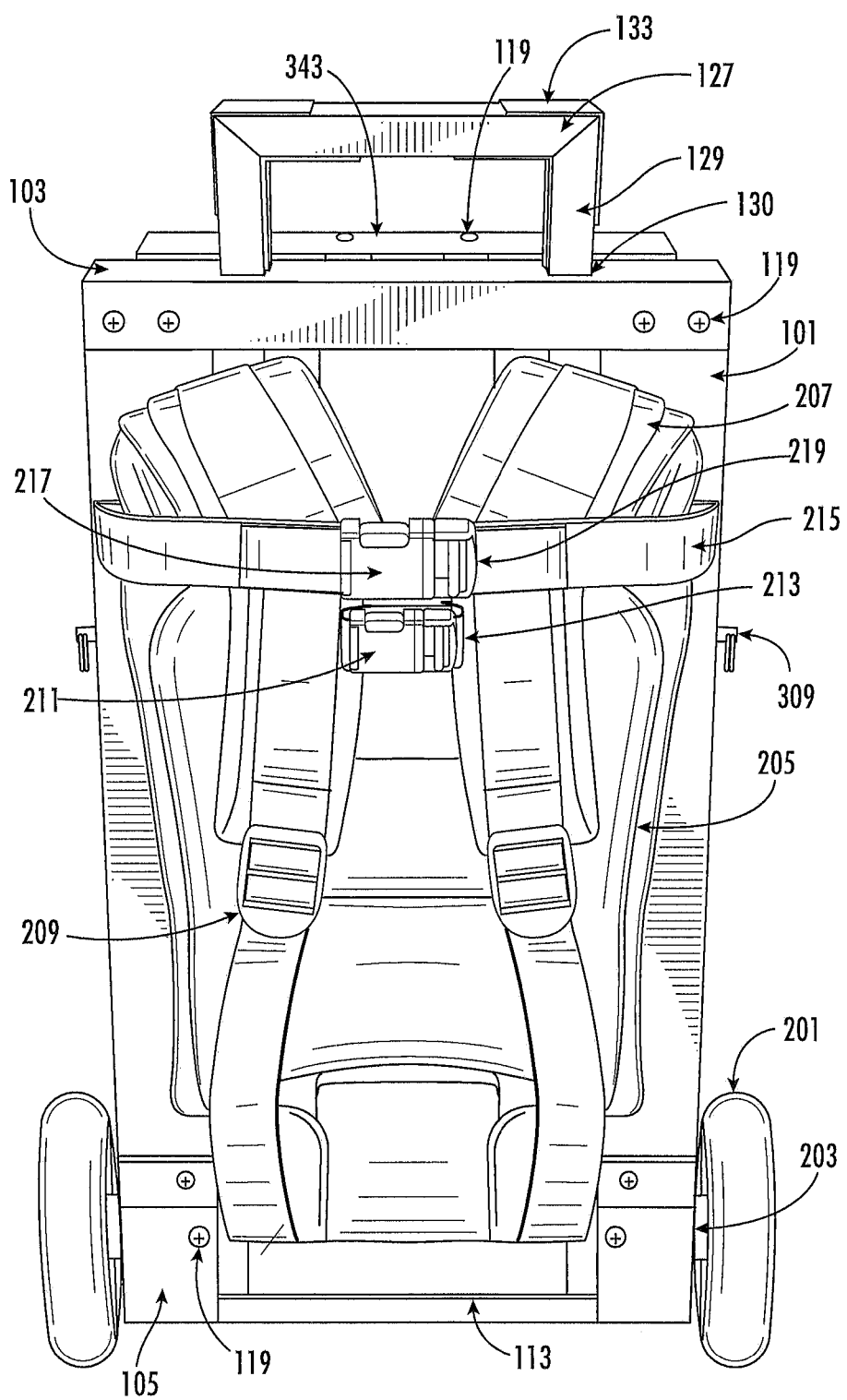
FIG. 2 is a back side view of the building ladder hoist, according to the present application.

Referring now to FIG. 2 in the drawings, the back of building ladder hoist 100 is illustrated. As shown in FIG. 2, building ladder hoist 100 further comprises padded back 205, padded replaceable straps 207, adjustment tabs 209, strap buckle housing 211, strap buckle insert 213, security strap 215, security strap buckle housing 217, and strap buckle insert 219. FIG. 2 also provides a back view of side walls 101, top plate 103, support box 105, dolly base 113, fasteners 119, handle 127, handle bar 129, handle supports 133, and upper top plate 343.

Padded back 205 is attached directly to the back of side walls 101. Padded back 205 supports the user while they are wearing the carrier and makes it easier for them to carry it around for longer periods of time. Padded back 205 is secured to the back of side walls 101 by back cushion fasteners 223 which can be seen in FIGS. 6 and 7. Connected to the top of padded back 205 are two padded replaceable straps 207 which are attached to the upper left and right side of padded back 205. Padded straps 207 allow the user to carry building ladder hoist 100 on their shoulders which will let users carry it for longer periods and experience less fatigue when having to go up building ladders, extension ladders, and stairs. Also, straps 207 being replaceable will allow the user to change them out if they become worn down or if the user desires straps that have more cushion. Padded replaceable straps 207 can also be tightened to fit the body of the user by using adjustment tab 209. Adjustment tab 209 uses the extra lengths of the straps to either make straps 207 tighter or looser on the user which will allow the user to set it to where it fits best on them so it's secured and comfortable.

Strap buckle housing 211 is found on the left padded strap 207 when looking at the back of building ladder hoist 100 and strap buckle insert 213 is on the right padded strap 207. Buckle insert 213 will be inserted into buckle housing 211 to secure the two padded straps 207 together. When secured in this fashion, the straps will not be able to slide off the user during movement. Security strap 215 provides a strap which holds the wide padded backpack straps up in place and keeps them high and tight and out of the way so they don't drag the ground or get damaged when not in use, storing, or towing building ladder hoist 100. Security strap 215 is attached to the sides of side walls 101 and strap 215 buckles over padded straps 207 when securing the straps to the carrier using security strap buckle housing 217 and security strap buckle insert 219. Security strap 215 is attached to end walls 101 by security strap fastener 221 which can be seen in FIG. 5, security straps 215 keep padded straps 207 high and tightly secured to the carrier when they are not in use.

Figure 3:
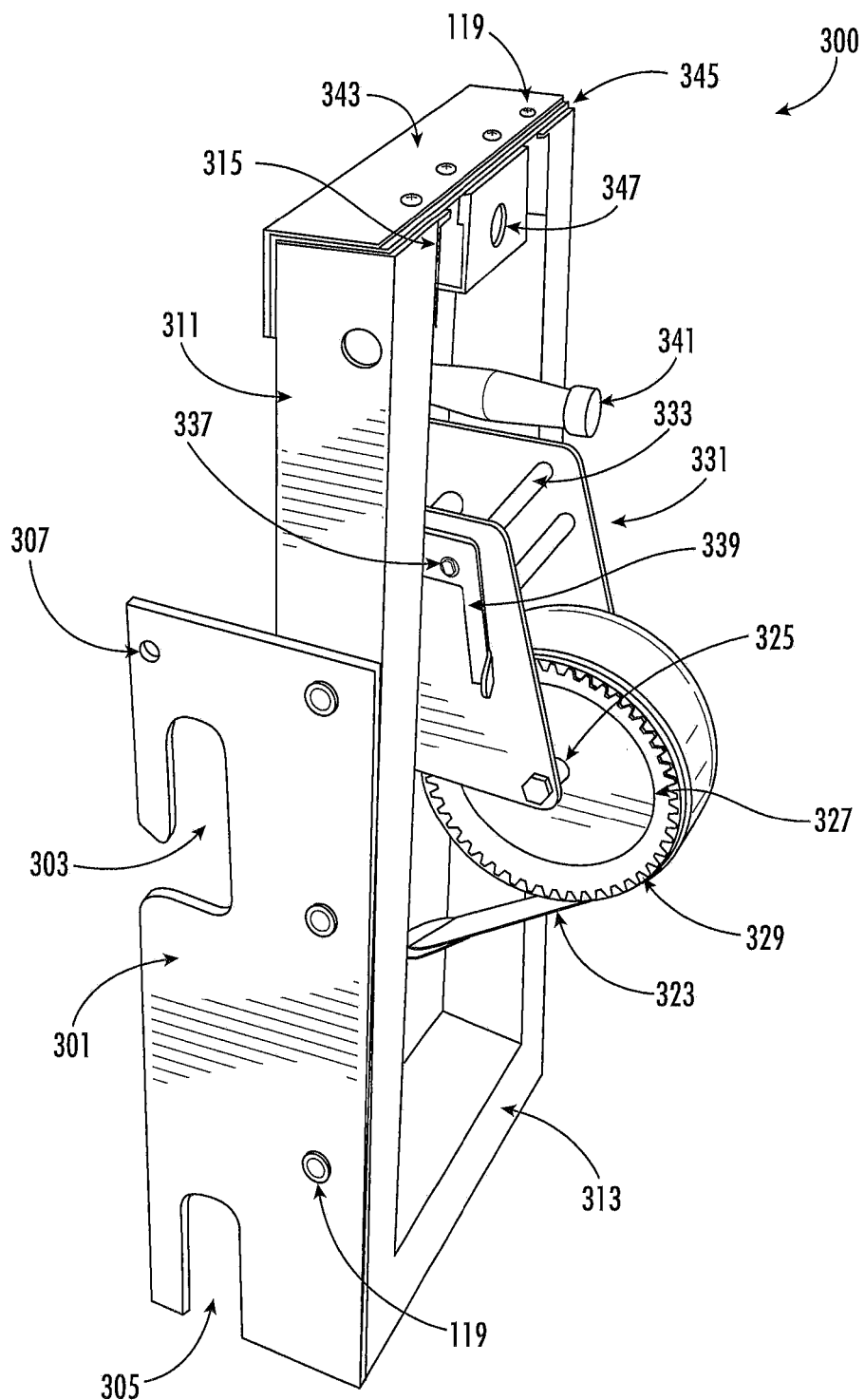
FIG. 3 is a perspective left side view showing the winch casing of FIG. 1, according to the present application.
Figure 4:
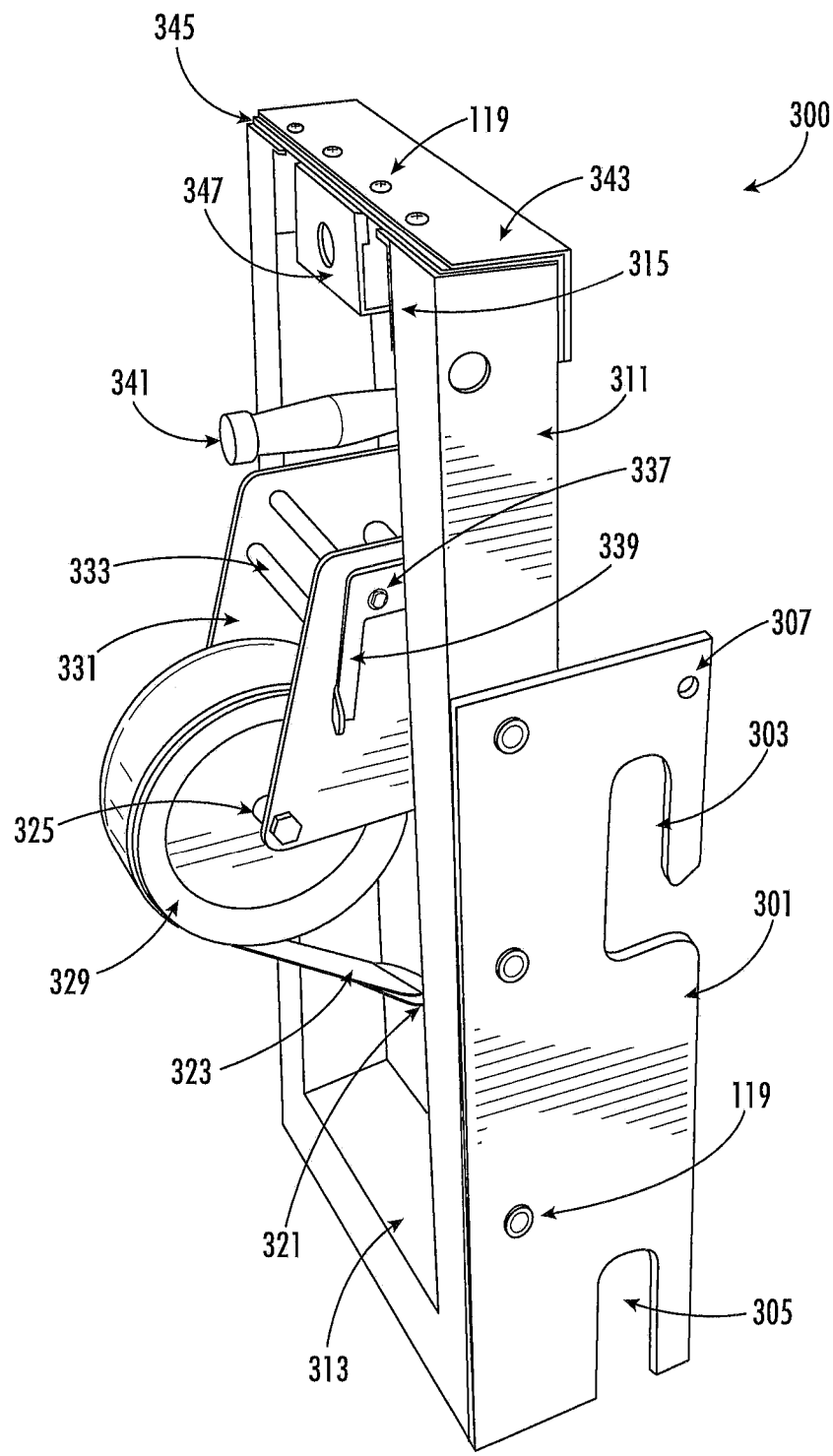
FIG. 4 is a perspective right side view showing the winch casing of FIG. 1, according to the present application.

Referring now to FIGS. 3 and 4 in the drawings, the sides of winch casing 300 with the winch boom 367 in the retracted position is depicted. These side views show that winch casing 300 comprises fasteners 119, side plate 301, upper groove 303, lower groove 305, fastener pin hole 307, end walls 311, base plate 313, side supports 315, hoist clip 321, winch strap 323, winch axle 325, winch main gear 327, winch outer plate 329, winch base 331, winch support bar 333, security bar fastener 337, rotational security bar 339, handle 341, upper top plate 343, lower top plate 345, and support box 347.

Winch casing 300 is rectangular in shape and is formed by end walls 311, base plate 313, upper top plate 343 and lower top plate 345. End walls 311 are hollow rectangular pillars that extend from the base to the top plates. End walls 311 may be made out of metal, wood, plastic, or any other light weight sturdy material. Being light weight, in combination with being hollow, allows winch casing 300 to be as light as possible to make it easy for individuals to carry building ladder hoist 100 with them. Base plate 313 is L-shaped and connects to the bottom of end walls 311. Attached to the top of base plate is boom security tab 379, shown in FIG. 1, which locks on to the end of boom 367 at the winch strap edge support 369 to keep it secured in the retracted position when not in use. Upper top plate 343 and lower top plate 345 connect to the top of end walls 311 and are stacked on top of each other to add extra support and stability for winch casing 300 when the winch is in use. Side supports 315 connect the side of end wall 311 to the bottom of lower top plate 345 and provide extra support to the top plates while securing them to end wall 311. Also, on the bottom of lower top plate 345 is support box 347 which is a hollow box that is designed to provide extra support to the top plates while winch casing 300 is in use. All of these supports are instrumental as the winch system may be used to hoist up objects that are larger and heavier than the winch itself. It is important winch casing 300 does not break or bend during the process of hoisting it and these supports provide the stability for the system to not buckle under the weight that is being lifted.

Side plate 301 is connected to the side end walls 311 either by general fasteners 119 or by these structures being welded together. Side plate 301 is, but is not limited to, rectangular in shape and on the section of side plate 301 which is not connected to end wall 311 are two grooves, upper groove 303 and lower groove 305. Upper groove 303 is nonlinear in shape and extends inward from the side of side plate 301 before extending upward. Lower groove 305 starts at the bottom of side plate 301 and extends upward before ending. These grooves are used to allow the user to have a quick and easy way to secure winch casing 300 to a ladder. The reason that upper groove 303 has its nonlinear shape is that it the notches will catch onto the ladder which will prevent winch casing 300 from coming undone during the process. At the upper portion of side plate 301 that is not connected to end wall 311 there is also fastener pin hole 307 which, when winch casing 300 and removable dolly carrier/casing 200 are together, fastener 309 will be inserted through it in order to secure these two casings together.

FIGS. 3 and 4 also provide a look at the winch system when it is not in use on winch casing 300. Connecting to the inside walls of end walls 311 is winch base 331. Between winch base 331 are support bars 333 which provide extra support for the whole system in order to keep it in place. Winch base 331 is C-shaped with the bottom edge extending further out then the upper edge. Rotational security bar 339 is connected to right side of winch base 331 by security bar fastener 337. Rotational security bar 339 is mostly flat with a tab protruding out from the end of it which the user will pull on to us it. Security bar 339 is designed so that a user will be able to pull on the bar in order to stop the gears inside the winch from turning in case the user wants to keep the item they are hoisting in place or if they lose control of the winch and need to stop it. Security bar 339 is connected to a support bar between winch base 331 which has an outer winch gear 335 attached to one end, as seen in FIG. 1. By pulling on rotational security bar 339, the support bars will be caught which will prevent outer winch gear 335 from turning which will also stop inner winch gear 351, shown in FIG. 1, which will stop the winch from turning and stopping the entire system.

Figure 8:
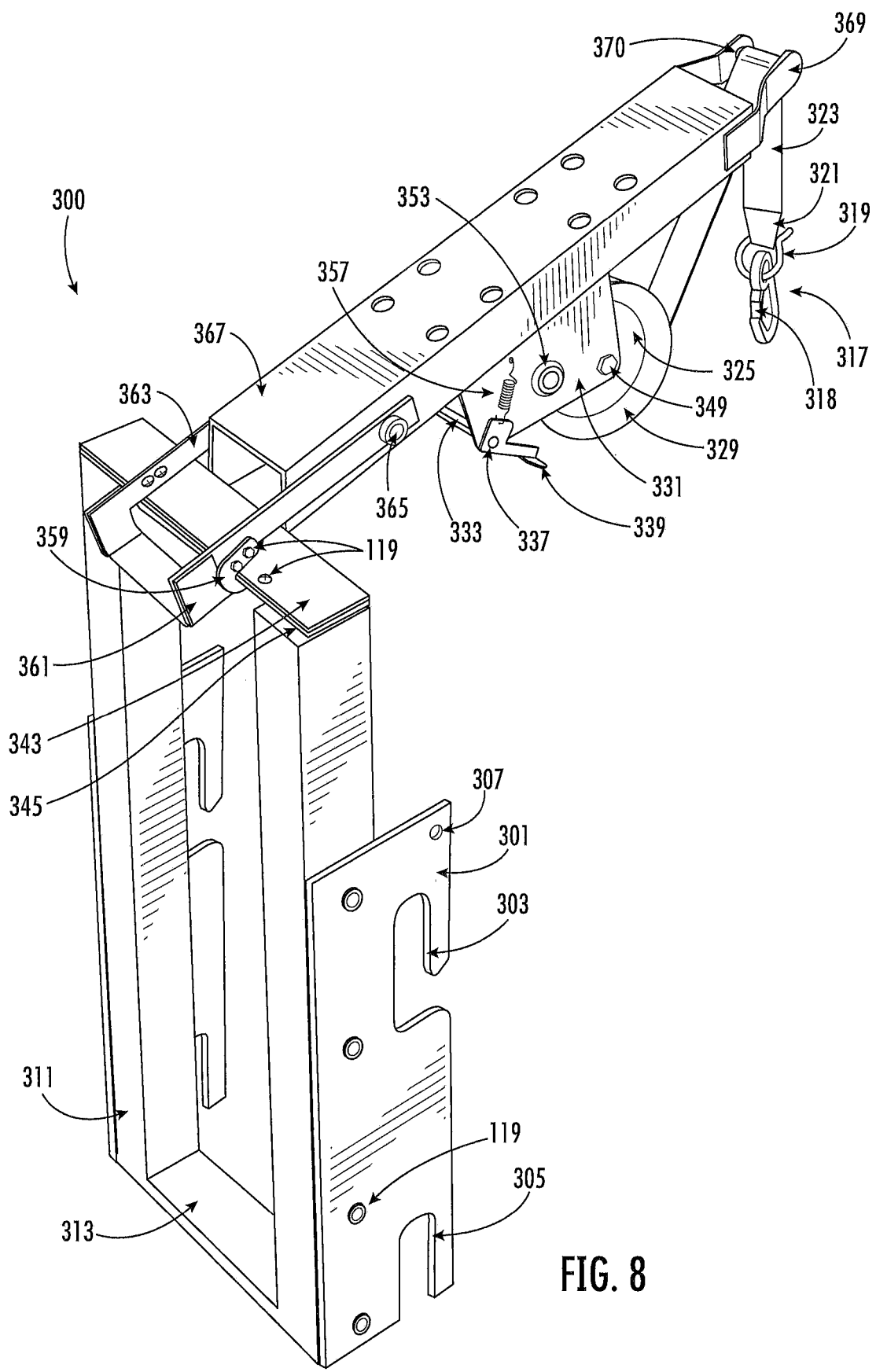
FIG. 8 is a perspective right side view showing the winch casing of FIG. 1, according to the present application.

The winch system is between the two winch bases 331 and connecting both bases is winch axle 325. Attached to the ends of winch axle 325 but in-between the two sides of winch base 331 are two winch outer plates 329. Axle fastener 349, as seen in FIG. 8, extends through both outer plates 329 and through axle 325 to secure the winch system to winch base 331. On the outer side of the left out plate 329 there is winch main gear 327 which is the main gear that handle 341 is used to turn to lower and raise winch strap 323. It is also appreciated that the winch system could be replaced with an electrical winch where a user would be able to lower or raise the winch using an electrical system instead of doing it by hand using handle 341. The electrical winch may be plugged into local power source on the building or may use batteries or other portable sources of energy for power. Winch strap 323 is stored by being wrapped around winch axle 325 when not in use and then winch main gear 327 is turned in order release and lower winch strap 323. Hoist clip 321 is a connecting loop at the end of winch strap 323 and connecting hook 319, which can be seen in FIG. 8, is secured through that loop. Connecting hook 319 is used to secure hoist hook 317, also seen in FIG. 8, to winch strap 323. Hoist hook 317 is used to attach to objects that the user wishes to hoist up a ladder or up a wall or any other space. Hook 317 has latch 318 which will secure the object in place where it is hooked, this latch will only be openable by putting pressure on it from the outside so any object putting pressure on it from the inside while being hoisted will not open latch 318.

Figure 5:
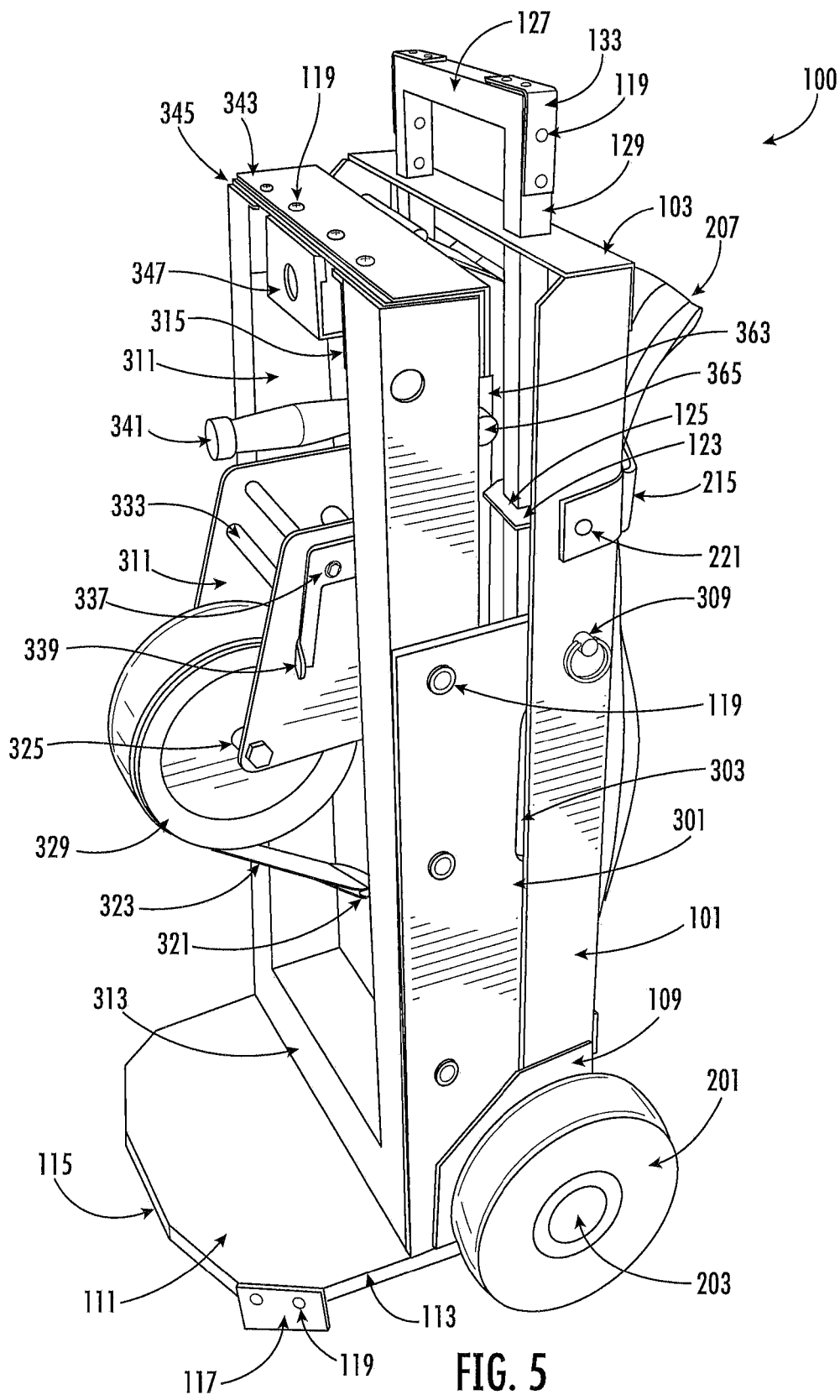
FIG. 5 is a perspective right side view of the building ladder hoist, according to the present application.
Figure 6:
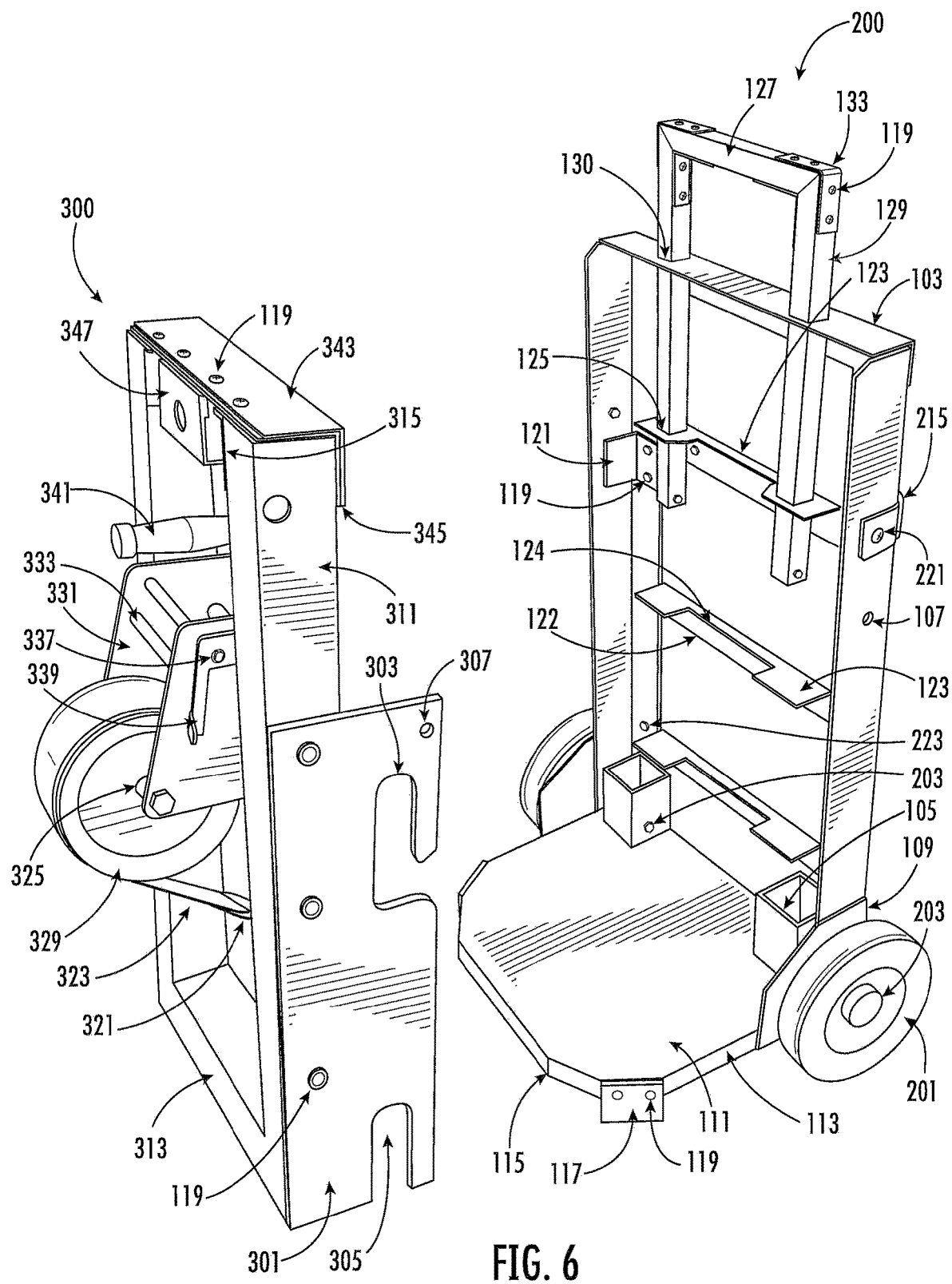
FIG. 6 is a perspective right side view of the building ladder hoist, according to the present application.

Referring to now FIGS. 5 and 6 in the drawings, a perspective side view of building ladder hoist 100 is shown. FIG. 5 shows a perspective view of carrier casing 200 and winch casing 300 configured together. FIG. 6 then shows a view of winch casing 300 being unhooked from carrier casing 200 and the two casings being separated from each other in a perspective side view.

Figure 7:
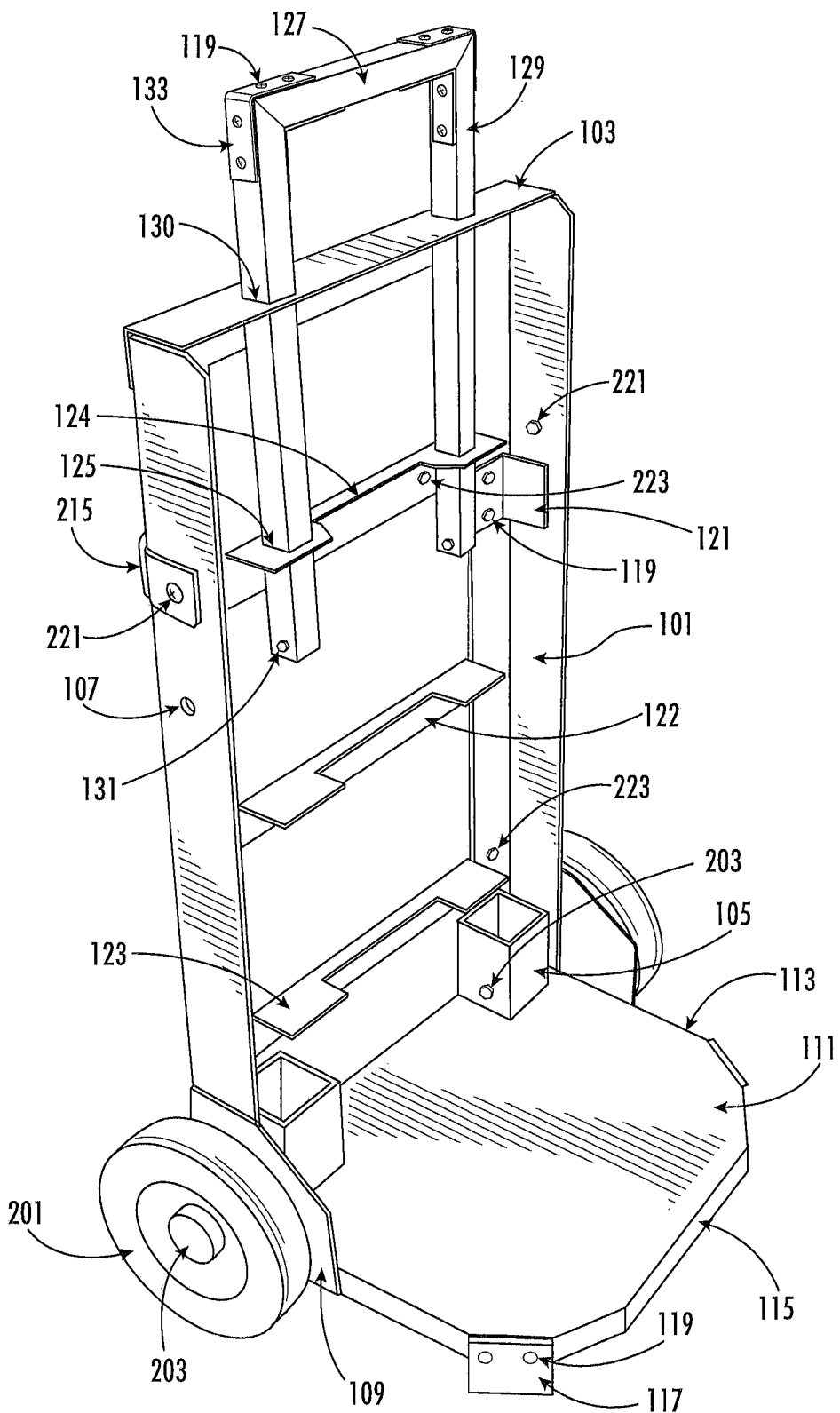
FIG. 7 is a perspective left side view showing the removable dolly carrier/casing of FIG. 1, according to the present application.

Referring now to FIG. 7 in the drawings, a perspective view of removable dolly carrier/casing 200 is shown. FIG. 7 shows that removable dolly carrier/casing 200 further comprises side walls 101, top plate 103, support box 105, fastener hole 107, side supports 109, dolly base 111, dolly side wall 113, segmented dolly front wall 115, support tab 117, fasteners 119, side wall supports 121, back wall supports 122, boom supports 123, notch 124, supports slot 125, handle 127, handle bars 129, upper supports slot 130, handle bar stoppers 131, handle supports 133, wheels 201, axles 203, and security strap 215, security strap fastener 221, and back cushion fastener 223.

Side walls 101 are L-shaped and are connected at the top by top plate 103, also L-shaped, and then connect at the bottom to dolly base 111. Side wall supports 121 are also L-shaped and are on the inside of side walls 101 and are fastened to these walls in order to provide extra support and stability to the structure. The walls and bases of carrier casing 200 may be made out of metal, wood, plastic or any other sturdy light weight material. It is important that this material is light weight as the user needs to be able to carry this equipment with them and if it is too heavy that would not be possible. The material also needs to be sturdy in order to not lose its form when in use. Side walls 101 and top plate 103 may be connected by fasteners 119 or they may be welded together. Both side walls 101 and top plate 103 being L-shaped provided extra support and increases the stability of the structure as a whole.

Dolly base 111 connects to the bottom of side walls 101 and may be secured by fasteners 119 or by welding the parts together. On the top of base 111 and connected to the back part of wide walls 101 is support box 105 which leaves a space between it and the side of side walls 101. Support box 105 is square in shape and is used to support wench casing 300 when it is attached to carrier casing 200. Support box 105 provides a platform for parts of wench casing 300 to lean against so that when in movement these parts will not get damaged. Also, support box 105 further provides support for axle 203 as it goes through and is secured in place by support box 105 which maintains the stability of the wheels during movement.

The dolly portion of carrier casing 200 is used in order to tow other objects that the user wishes to bring with them so that way they can keep their hands free while also putting less strain on their bodies. The dolly is formed by dolly base 111, dolly side walls 113, and segmented dolly front wall 115. Dolly side walls 113 are straight and connect in the back to side walls 101 either through fasteners or by being welded together. Connected to the sides of side wall 101 and dolly side wall 113 is side support 109 which further connects these two ends to secure the parts together and provide extra stability. Side support 109 may connect these two side walls either through fasteners or by being welded together. Segmented front wall 115 is segmented into five sections, but is not limited to five and may be segmented into more or less sections. Attached to one of the sections of front wall 115 is support tab 117 which can either be fastened to front wall 115 with fasteners 119 or by being welded to it. Support tab 117 is a square plate which is used in order to support carrier casing 200 in the upright position when it is not in motion.

Connecting over the gap between the side walls 101 are back wall supports 122. These supports stretch the gap between side walls 101 as there is no back wall and provide support for carrier casing 200 while also providing a place for boom 367 to lean against when not in use. The lack of a back plate is to make it less weight and supports 122 are used to provide support and stability of the structure. Attached to the ° top of back wall supports 122 are boom supports 123 which project out from back wall supports 122. Boom supports 123 have a notch 124 in the middle of them which is the same width as boom 367 which will keep it secure when not in use. Back wall supports 122 and boom supports 123 together maintain the stability of the winch system when it is not in use and when the user is carting it from location to location. With all the movement involved, without these supports maintaining the system, there is a chance it could be damaged and become too dangerous to use.

At the top of carrier casing 200 is the handle system which allows the user to pull the cart behind them if they are already carrying something on their back or if they just do not desire to carry it. Handle 127 is rectangular in shape and is connected at both ends by handle bars 129. Handle supports 133 are used to secure handle 127 to handle bars 129 while also providing more stability, these sections can be secured together either with fasteners 119, or by being welded together. Handle bars 129 extend down through upper support slot 130 in top plate 103 and through support slot 125 in the upper most boom support 123. These slots are just big enough for handle bars 129 to slide through them but not big enough to provide leeway for movement in the horizontal direction so handle bars 129 will be secure in these slots and will only be able to move up or down. Handle bar stoppers 131 are installed at the bottom of handle bars 129 and they are protrusions that stick out from handle bar 129 to prevent it from being removed from the slots. These prevent the handle system from being removed from its housing which will allow the user to use it without concern that building ladder hoist 100 will get loose in transit.

Figure 9:
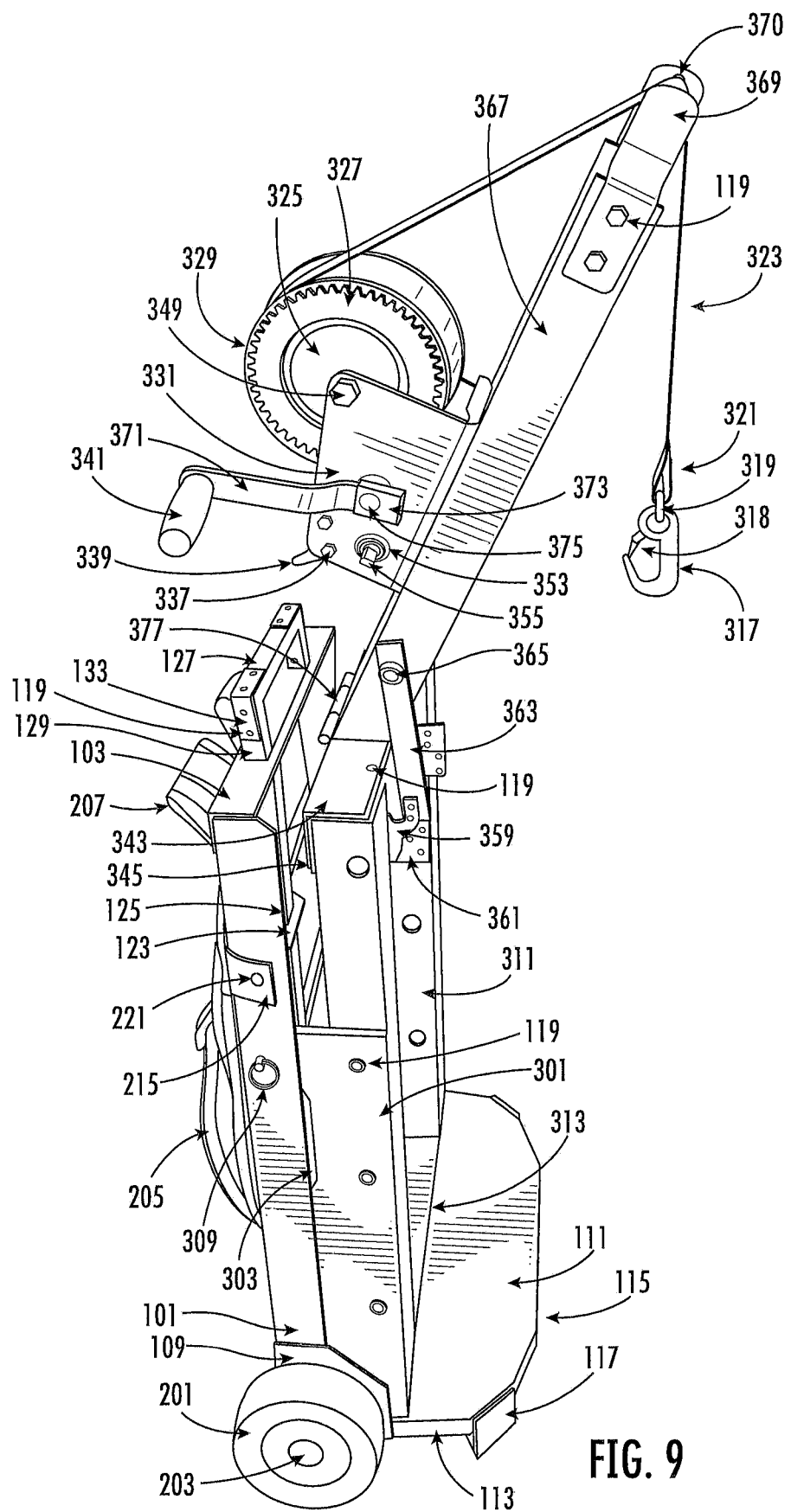
FIG. 9 is a perspective right side view of the building ladder hoist, according to the present application.
Figure 10:
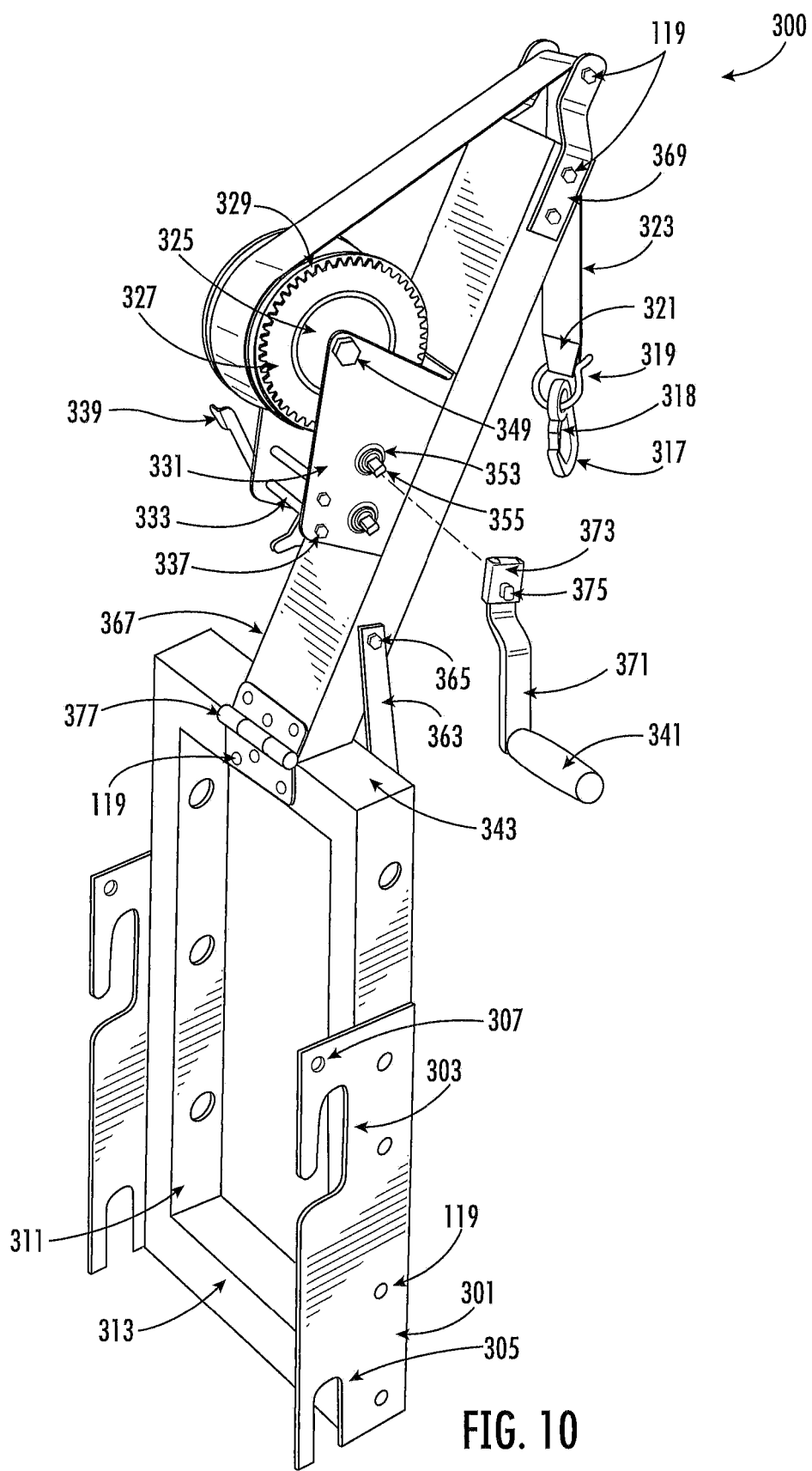
FIG. 10 is a perspective left side view showing the winch casing of FIG. 9, according to the present application.

Referring now to FIGS. 8, 9, and 10 in the drawings, building ladder hoist 100 is shown with the retractable boom in the retracted position with the boom safety stop engaged. These figures show that wench mechanism includes hoist hook 317, connecting hook 319, hoist clip 321, winch strap 323, winch axle 325, winch main gear 327, winch outer plate 329, winch base 331, winch support bar 333, security bar fastener 337, rotational security bar 339, handle 341, axle fastener 349, winch handle tab base 353, winch handle tab 355, security bar spring 357, rotation stopper 359, support plate 361, boom support bar 363, boom safety stop fastener 365, boom 367, winch strap edge support 369, edge support axle 370, winch handle bar 371, winch handle base 373, winch handle base slot 375, and hinge 377. These figures demonstrate how the winch system is attached to boom 367.

When using the winch system on building ladder hoist 100, handle 341 is removable to allow for easy storage when not in use. When not in use the handle can be stored between the two winch bases 331 as seen in FIG. 1. Handle 341 is attached on one end to winch handle bar 371 which extends at an angle. At the end of handle bar 371 is winch handle base 373 which is a square plate with base slot 375 in the middle of it. On the outside of the right winch base 331 there are two tabs which are formed by winch handle tab base 353 which has winch handle tab 355 protruding from it. Each handle tab base 353 connects to a support bar 333 that has a gear attached to it, so by inserting slot 375 over tab 355, the user will be able to turn handle 341 to turn the gears of the winch system.

Winch strap edge support 369 is found at the end of boom 367 and is used in connection with winch strap 323. Edge support 369 may be connected by either fasteners 119 or by being welded to boom 367. Winch edge support 369 is separated into three segments, though it may be separated into more or less segments, it has one straight segment which attaches to the sides of boom 367, it has a tilted slight curved section that goes inward beyond the edge of boom 367 then finally has another straight section that goes out and ends with a circular edge. Between the final straight segment of edge support 369 is axle 370 which extends between the gap of the two final segments of support 369. Support 369 and axle 370 are used as a support for winch strap 323 which will extend upward from the winch then go over axle 370 before extending back down. This provides extra support and stability for the system when it is being used to hoist an object and it serves as a handle for retrieval of the boom.

Figure 11A:
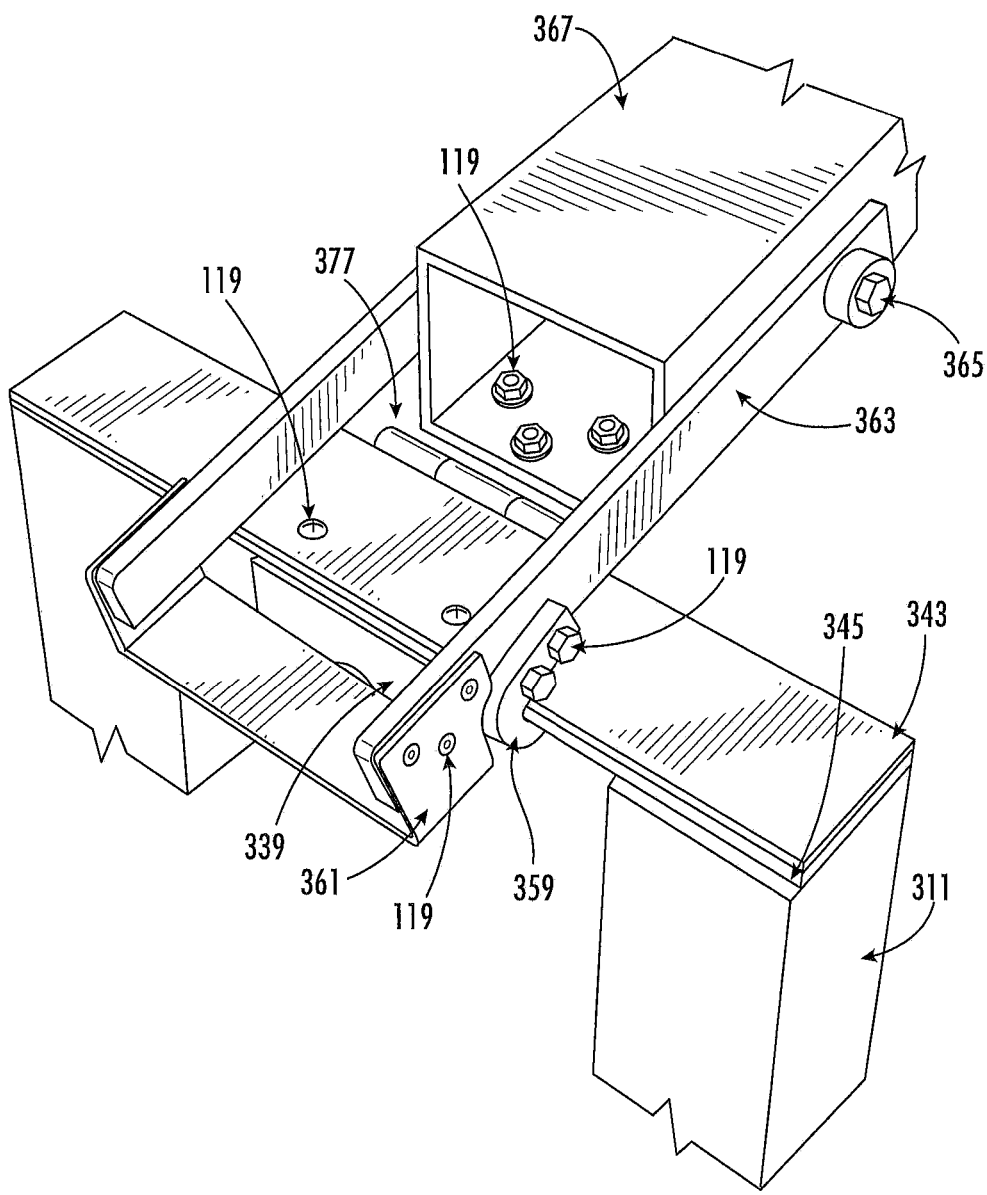
FIG. 11A is a partial perspective left side view showing the winch casing of FIG. 9, according to the present application.

Referring now to FIG. 11A in the drawings, a close up view of winch casing 300 with the boom stop engaged stopping the boom from falling any further. FIG. 11A shows a close up of the system from FIGS. 8-10 of how boom 367 extends into the upright position which is comprised of rotation stopper 359, support plate 361, boom support bar 363, boom safety stop fastener 365, boom 367, and hinge 377.

Hinge 377 provides the main function that allows for boom 367 to rotate between the up and down positions. Hinge 377 is attached to one side of boom 367 and to the underside of lower top plate 345. Hinge 377 may be attached by fasteners 119 or it may be welded instead. Boom support bar 363 is attached to the sides of boom 367 by fasteners 365 and provides support for boom 367 while in use. On the other end of boom support bar 363, support plate 361 is a C-shaped support that attaches to the sides of bar 363, either by fasteners 119 or by welding. Support bar 363 and support plate 361 are designed to provide extra support for boom 367 when it is in use in order to make sure the object being hoisted make its securely to its location. Also attached to the side of support bar 363 are rotation stoppers 359 which are either attached by fasteners 119 or by the parts being welded together. Stoppers 359 are U-shaped and are designed to catch boom 367 once it has extended to a certain point. The side of stopper 359 that is not fastened to support bar 363 is positioned in order to catch onto lower top plate 345 when it is extended to a certain point which will stop boom 367 from extending any further. This limits the range of motion that boom 367 will be able to rotate which will secure it in place when in use.

Figure 11B:
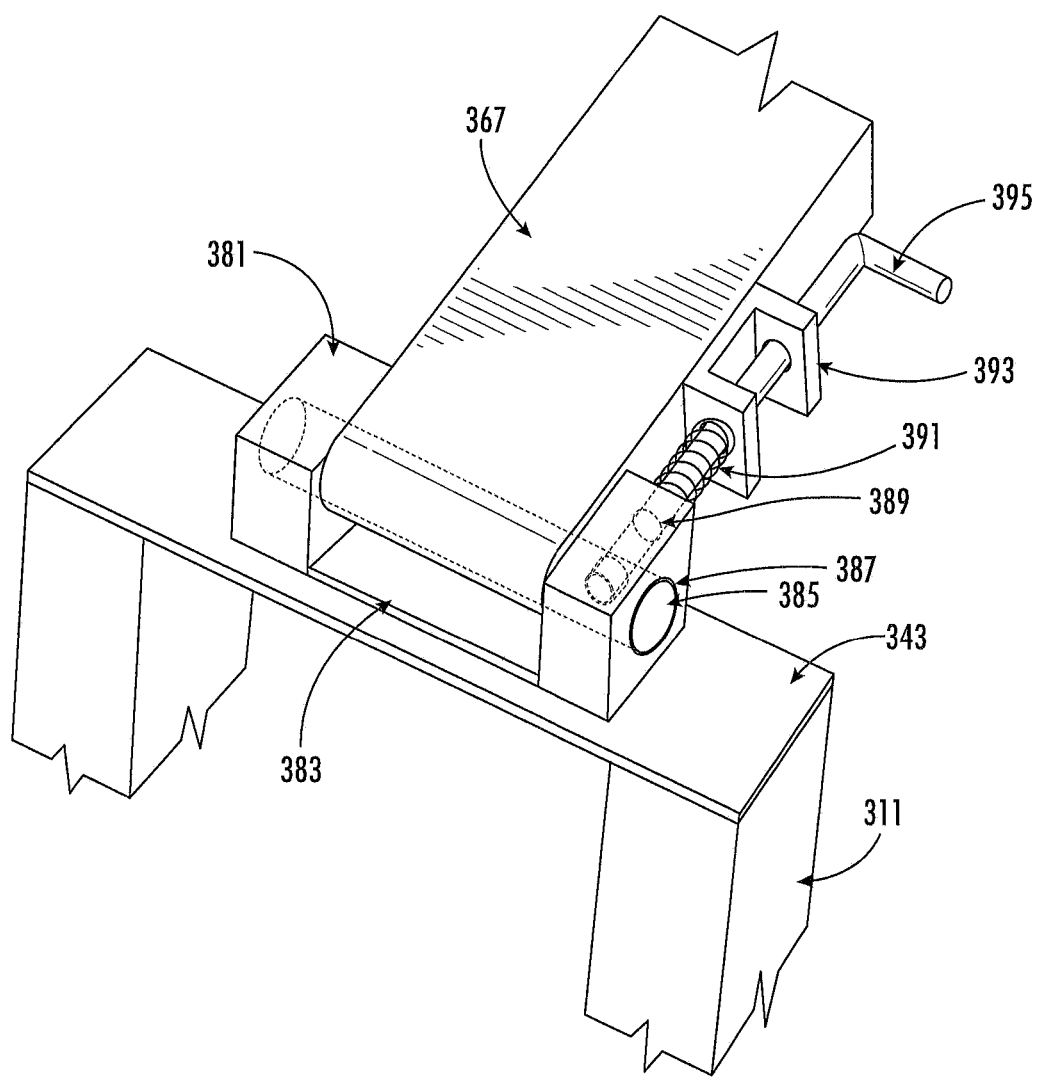
FIG. 11B is a partial perspective left side view showing an alternative embodiment of the winch casing according to the present application.

Referring now to FIG. 11B in the drawings, a close up view of an alternative embodiment of the boom stop and boom axle on winch casing 300 is shown. FIG. 11B shows an alternative embodiment to how the boom extends into position and includes axle support plates 381, axle housing 383, axle 385, axle hole 387, pin hole 389, spring 391, pin release 393, and pull release pin 395.

In this alternative embodiment, instead of using hinge 377 to control how boom 367 is retracted, an inside axle 385 is used. Attached to upper top plate 343 are two axle support plates 381 which are cube shaped. Support plates 381 are on both sides of axle housing 383 which houses and supports axle 385 which directly connects to boom 367. Support plates 381 are used in order to support and secure boom 367 to winch carrier 300. Axle 385 is designed in order to provide boom 367 with a range of movement while also being secured inside of housing 383. Being secured inside of housing 383 will prevent the user from getting snagged by boom 367 when it is in motion as there will not be the crevices between the boom 367 and hinge 377 such as the ones seen in FIG. 11A. Axle 385 is inserted into its housing through axle hole 387, Axle 385 is also long enough to where a portion of it is in support plates 381 which provides extra supports for the system. On the top of the right support plate 381 is pin hole 387 which provides a location for pin 395 to be inserted through support plate 381 to stop axle 385 in its location which will secure boom 367 where it currently is. Pin 395 has spring 391 running along it so when pin 395 is inserted the spring will become compressed, and will secure pin in support plate 381 until pin release 393 is used. Pin release 393 is C-shaped and is used to keep spring 391 condensed when pin 395 is inserted. When the user wishes to remove pin 395 from support plate 381, they will disengage release 393 to release spring 391. Once released, pin 395 will regain its range of movement and can be removed from pin hole 387 allowing the user to modify the angle that boom 367 is set at before locking it in place again.

Figure 12:
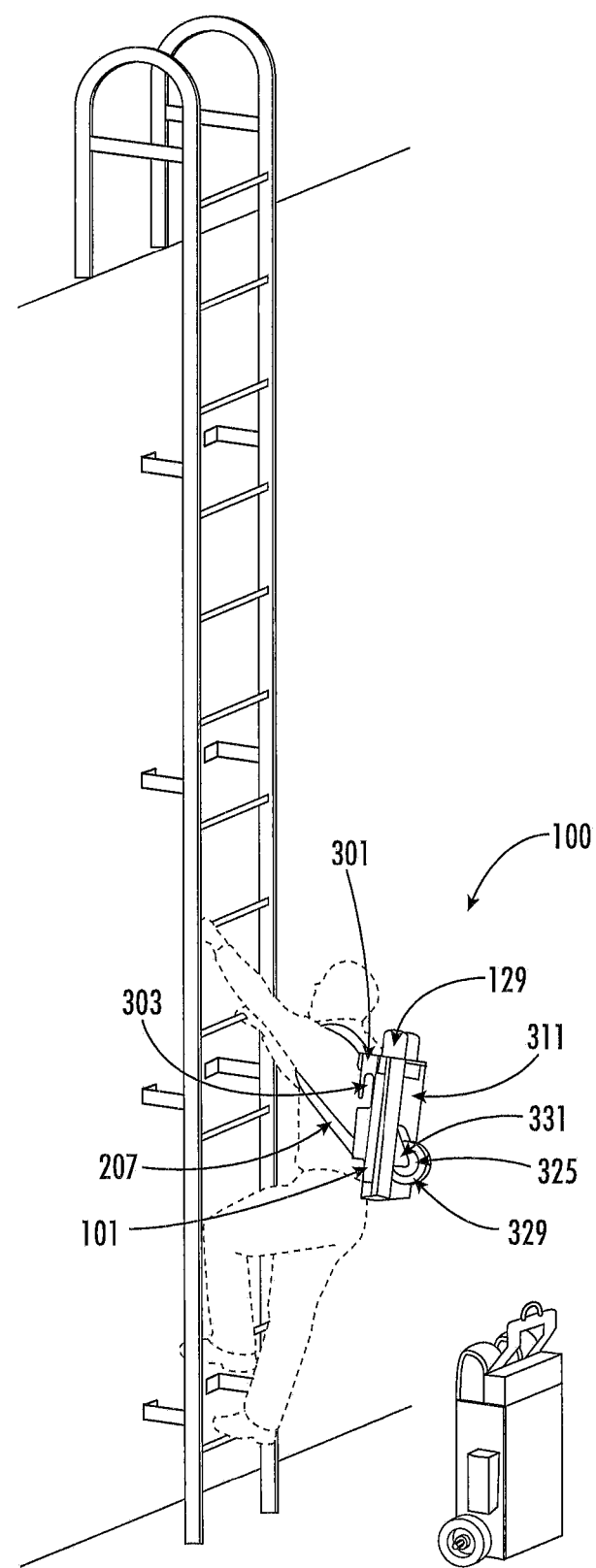
FIG. 12 is a perspective left side view of the building ladder hoist, according to the present application.

Referring now to FIG. 12 in the drawings, an individual climbing a building ladder with building ladder hoist 100 is shown. In this figure, building ladder hoist 100 is attached to the back of an individual using back straps 207. FIG. 12 shows how straps 207 will be used to allow an individual to climb a building ladder hands free while having building ladder hoist 100 attached to their back.

Figure 13:
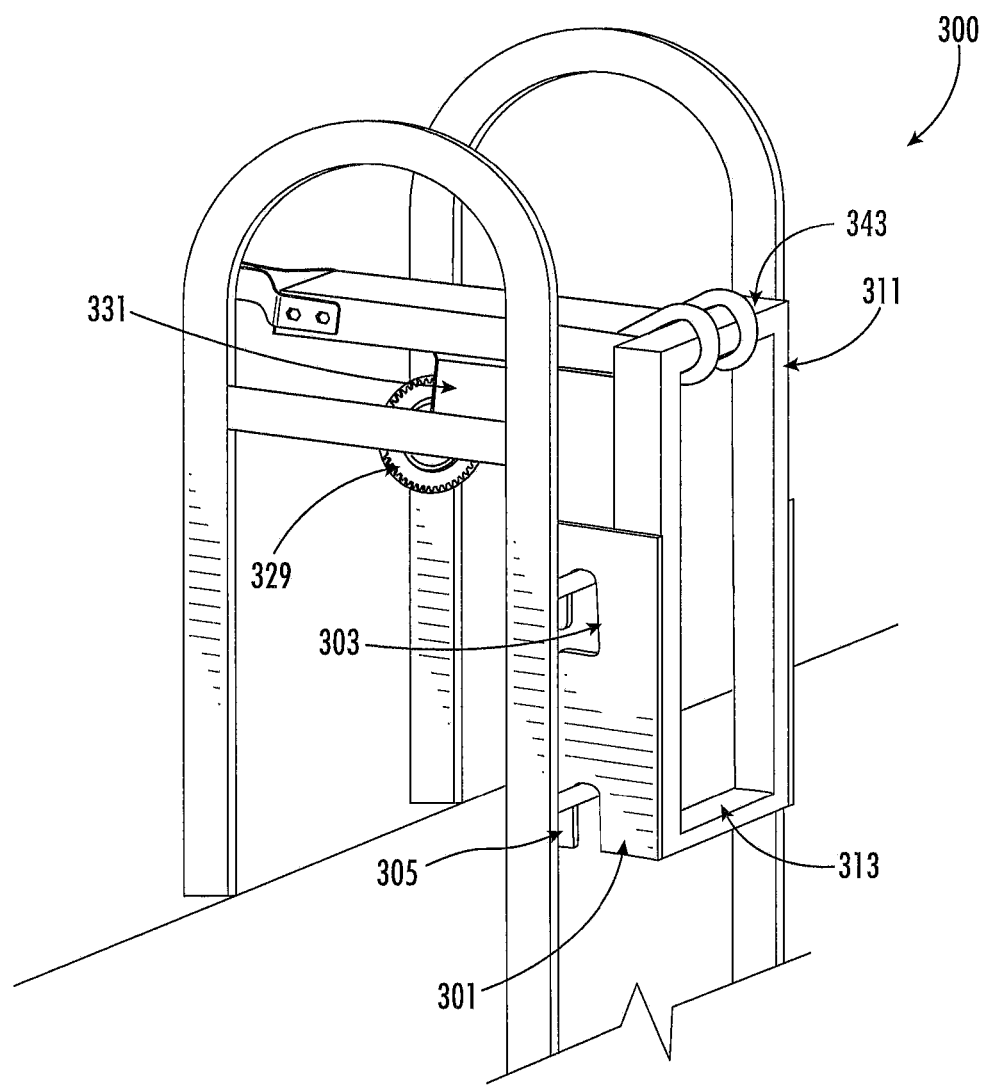
FIG. 13 is a perspective left side view of the building ladder hoist, according to the present application.
Figure 14:
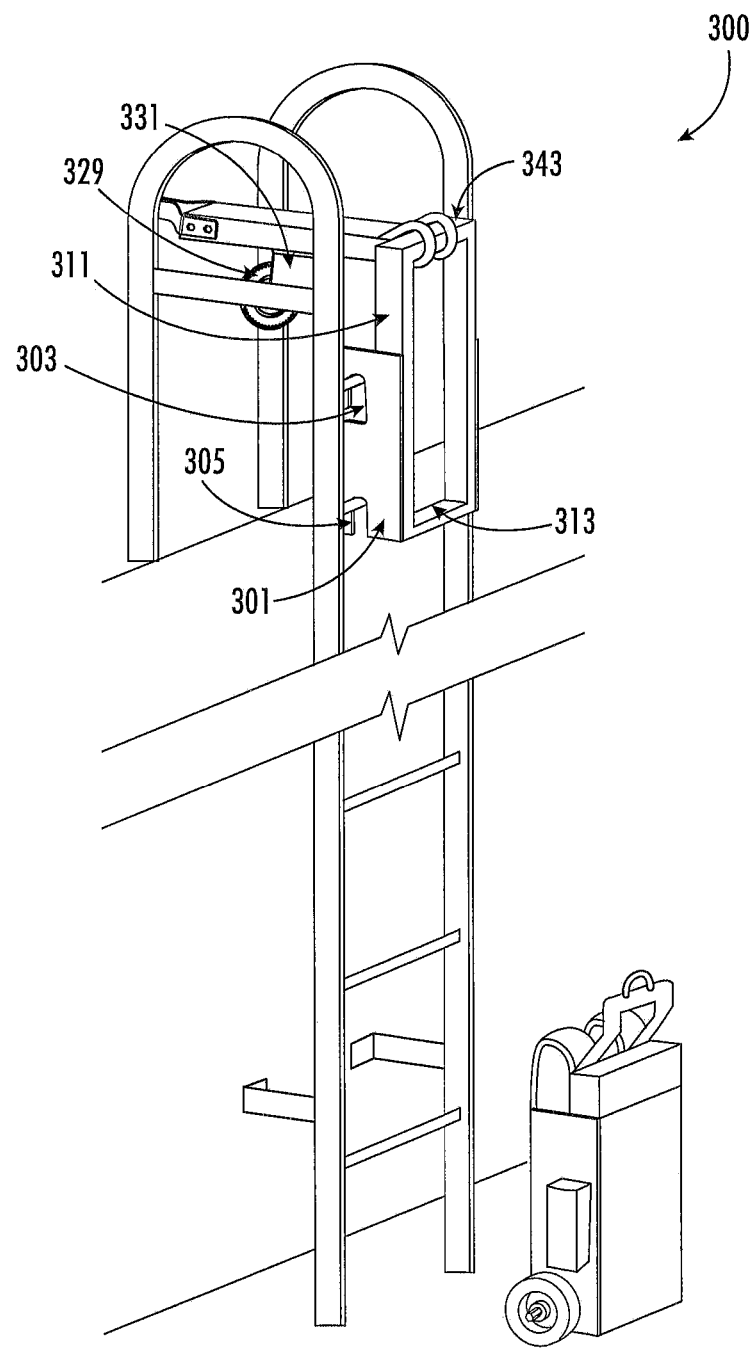
FIG. 14 is a perspective left side view of the building ladder hoist, according to the present application.
Figure 15:
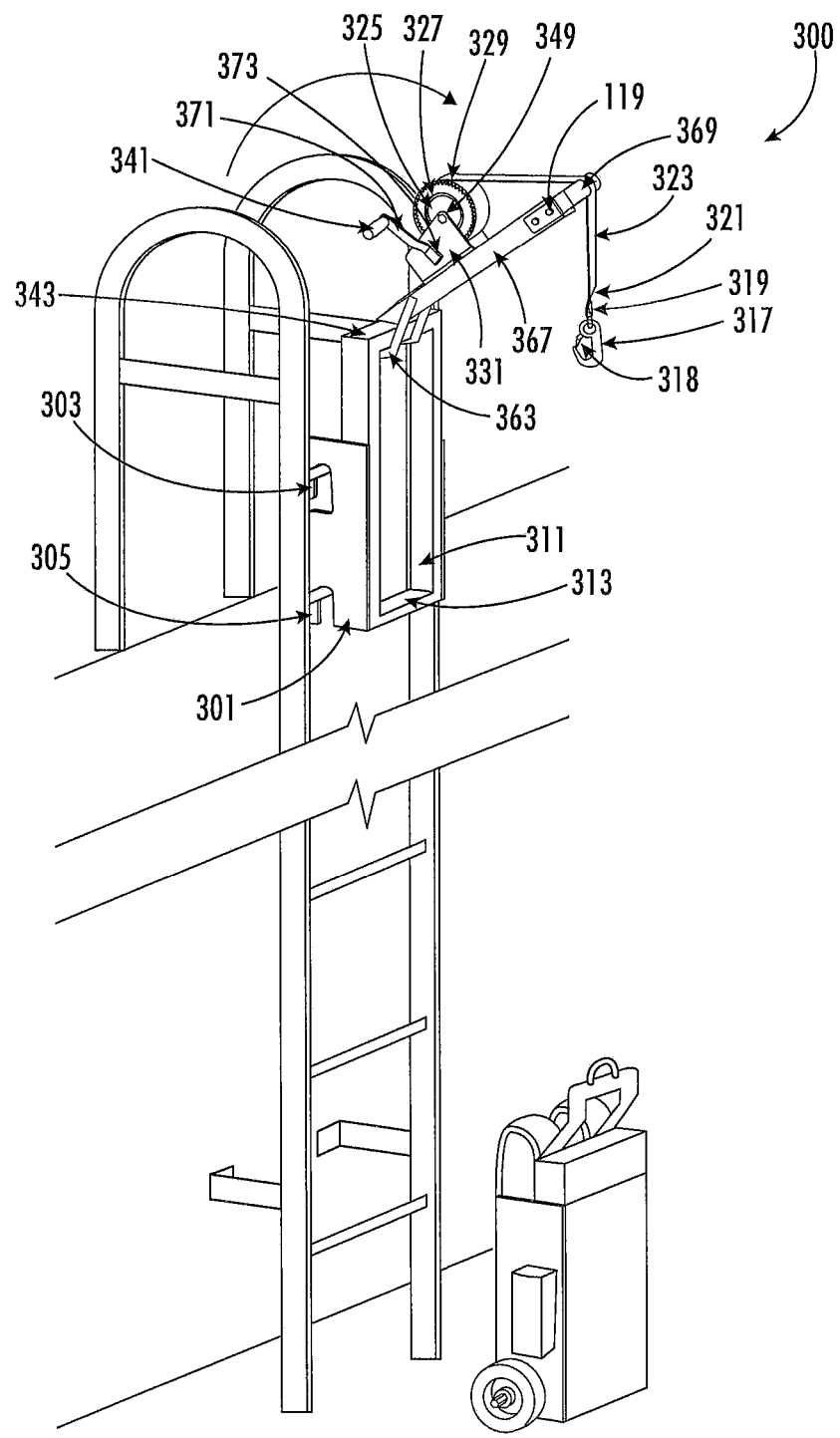
FIG. 15 is a perspective left side view of the building ladder hoist, according to the present application.
Figure 16:
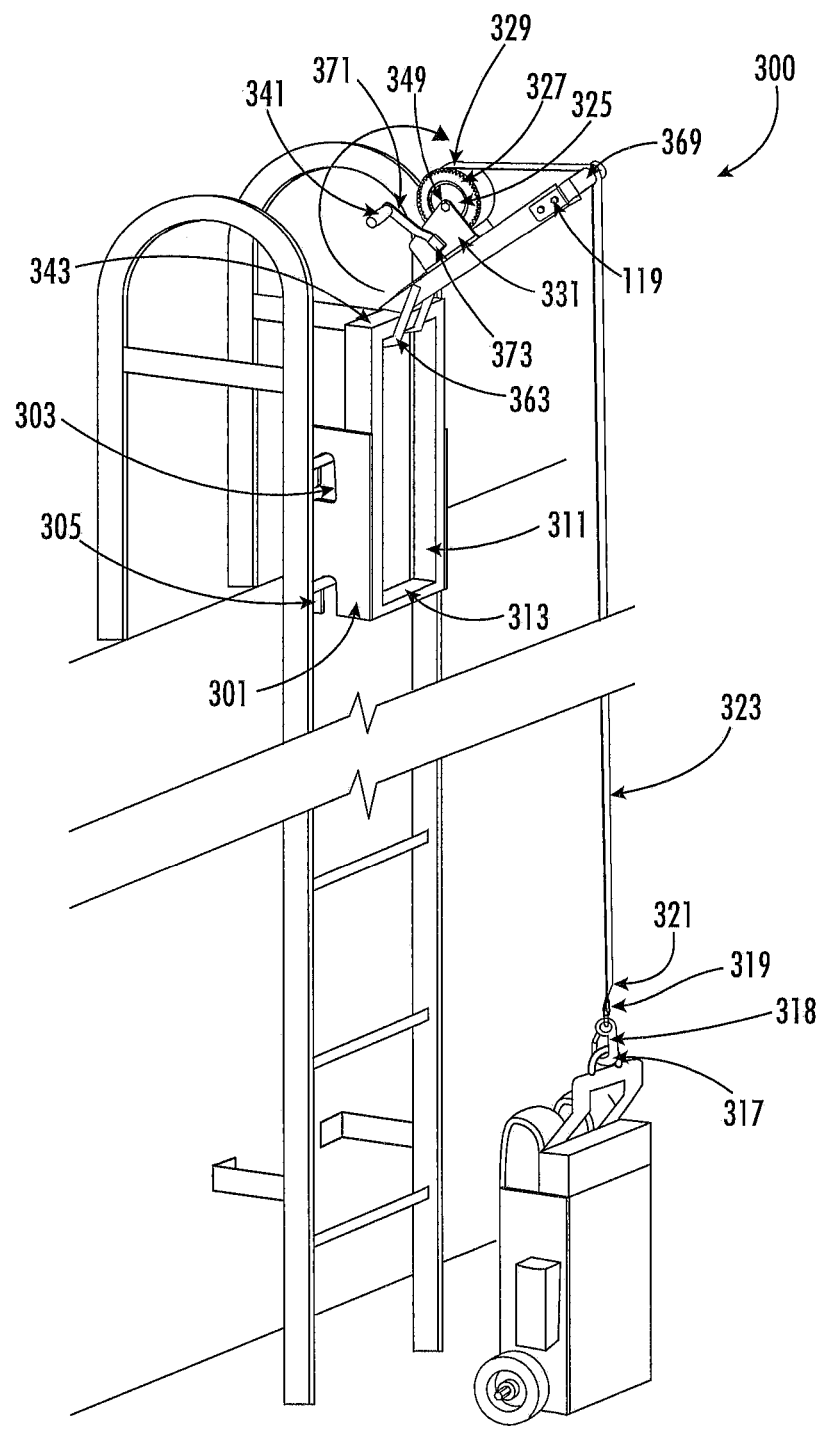
FIG. 16 is a perspective left side view of the building ladder hoist, according to the present application.
Figure 17:
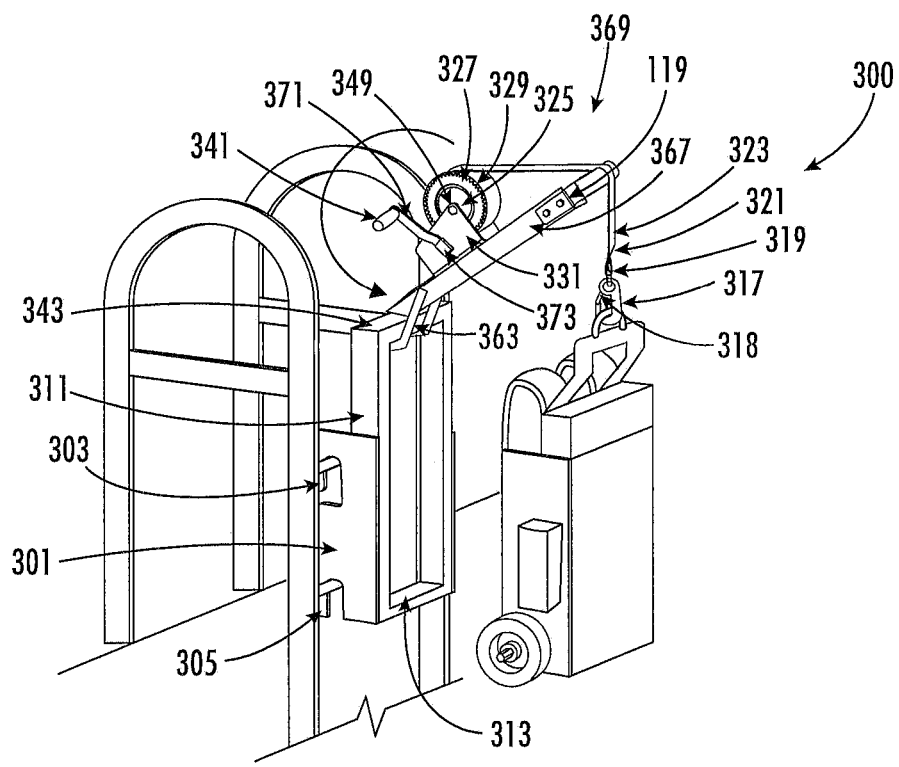
FIG. 17 is a perspective left side view of the building ladder hoist, according to the present application.
Figure 18:
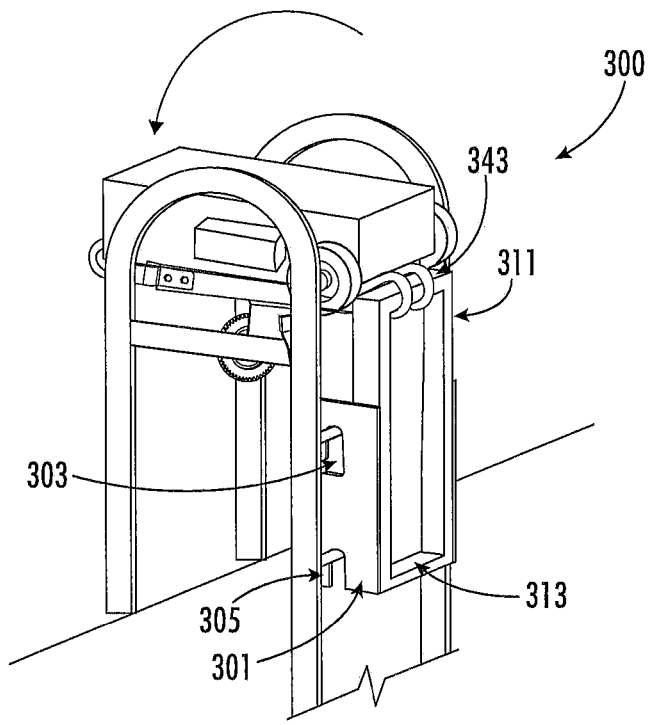
FIG. 18 is a perspective left side view of the building ladder hoist, according to the present application.

Referring now to FIGS. 13-18 in the drawings, winch carrier 300 is shown attached to a building ladder. One of the important features of winch carrier 300 is being able to securely connect to the rungs of a ladder to allow an individual to hoist up other equipment, tools, or any other object. FIG. 13 shows winch carrier 300 being securely connected to the rungs of a ladder. FIGS. 14-18 then show the step by step process of using the winch system to hoist an object up the ladder and onto the roof. FIG. 15 shows hoist arm 367 being extended out and FIG. 16 shows winch strap 323 extending down to allow hook 317 to connect to the object. FIG. 17 shows the object hoisted up to the top of the roof and FIG. 18 then shows the boom 367 in the retrieved position and locked into place by boom safety stop 365 so the user can safely and easily remove the equipment. The rotation ability of boom 367 is utilized in this way be being able to rotate boom 367 back into the retrieved position while the object is attached as this will allow the user to not have to reach out over the edge to remove the equipment and instead the object that was hoisted will be at an easy location for the user to grab. This is the main function of building ladder hoist 100 and these figures demonstrate the ease of safely bring equipment, tools, or other objects to the roof of the building.

Figure 19:
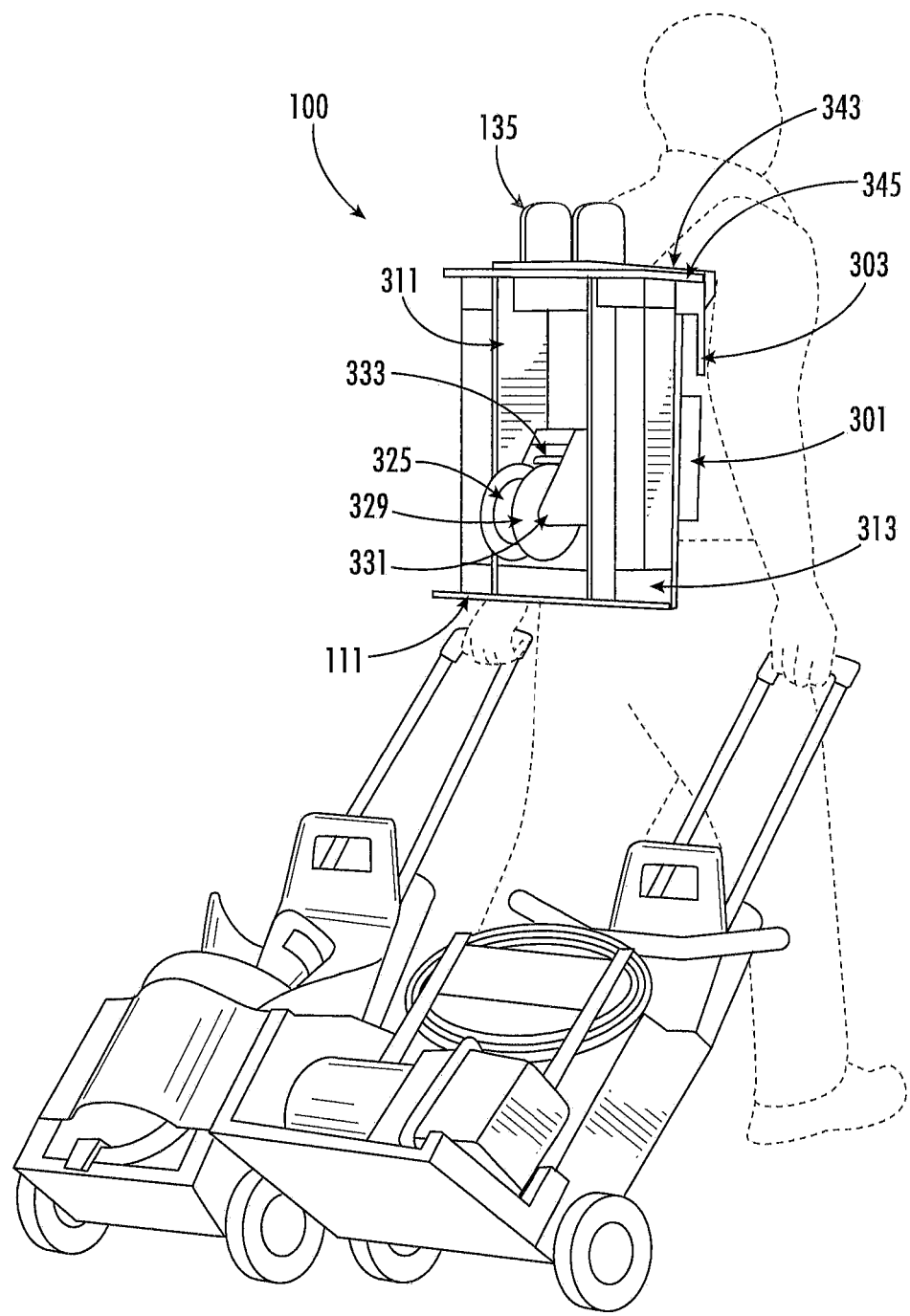
FIG. 19 is a perspective right side view of the building ladder hoist, according to the present application.

Referring now to FIG. 19 in the drawings, this shows an individual wearing alternative building ladder hoist 400 while walking. Alternative building ladder hoist 400 is securely attached to the back of the user using back straps 207 in this figure. By securing alternative building ladder hoist 400 to the back of the user, the user will have both hands free during transit which will allow them to tow other objects with them. This will cut down on the number of trips the user will need to take and lessen the strain on the individual.

Figure 20:
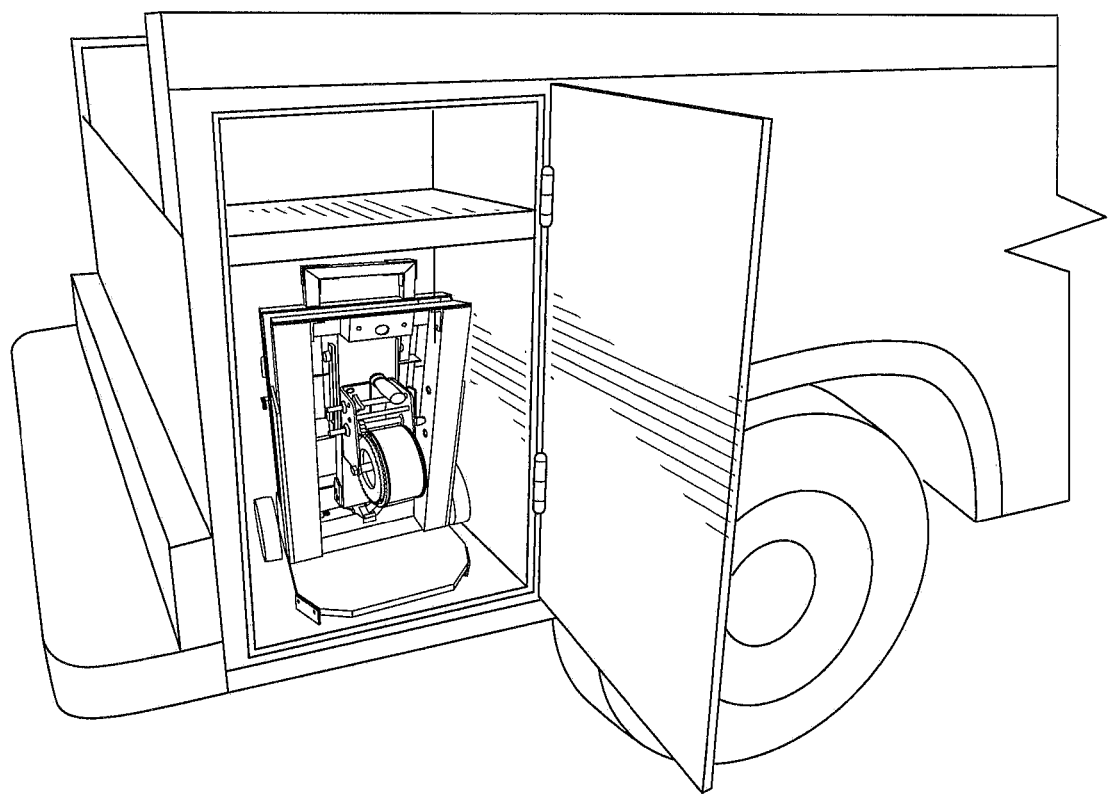
FIG. 20 is a perspective left side view of the building ladder hoist, according to the present application.

Referring now to FIG. 20 in the drawings, a perspective front view of building ladder hoist 100 being stored in a truck is depicted. It is important that building ladder hoist 100 be small and compact so that way it does not take up too much space wherever it is stored. FIG. 20 depicts this by showing building ladder hoist 100 being compact and stored in a standard storage compartment that could be found on the side of work trucks.

Figure 21:
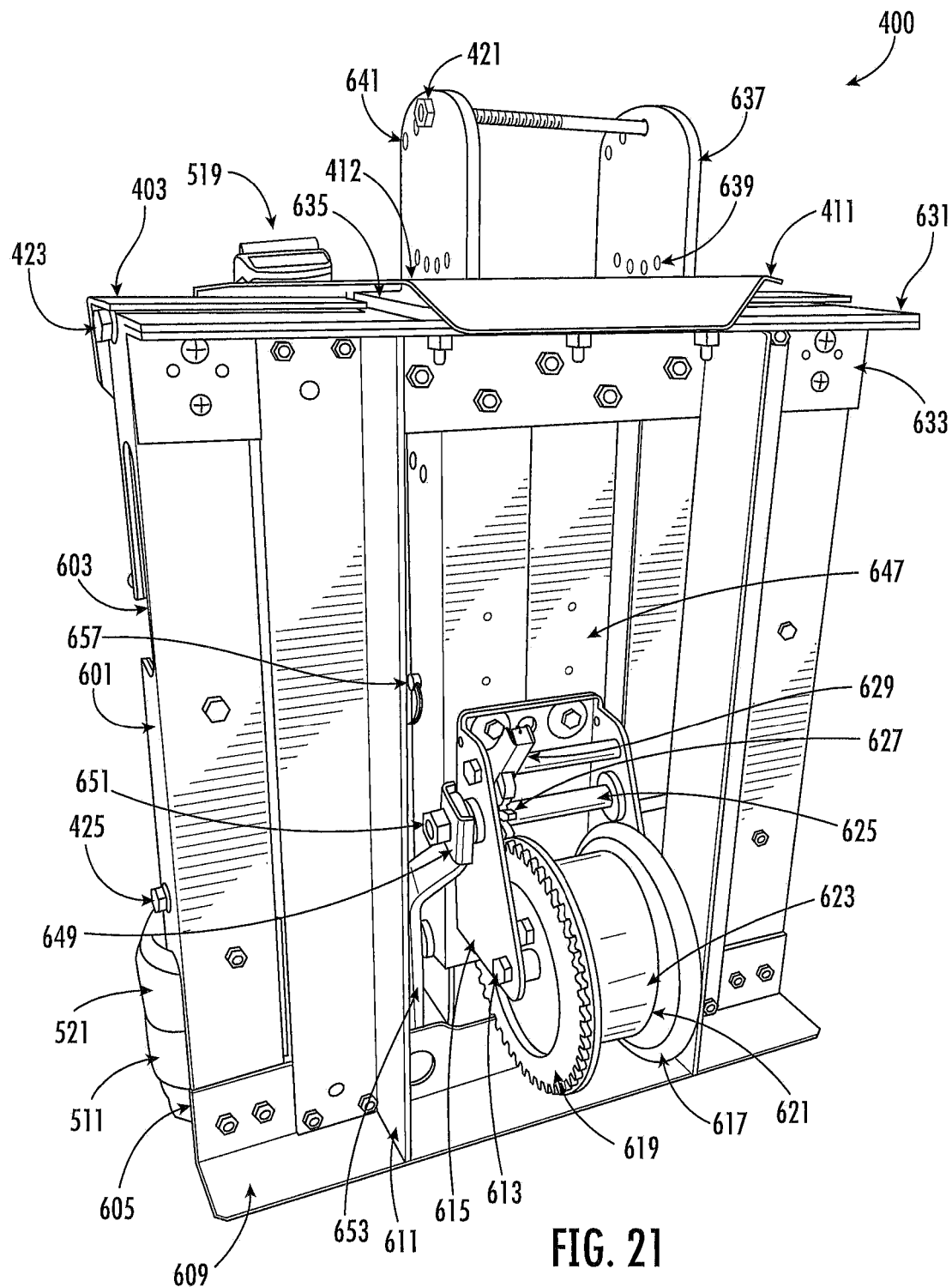
FIG. 21 is a perspective front view of an alternative embodiment of the building ladder hoist, according to the present application.

Referring now to FIG. 21 in the drawings, a perspective view of an alternative embodiment of building ladder hoist 100 is depicted. Alternative building ladder hoist 400 is split between removable carrier casing 500 and winch casing 600.

FIG. 21 shows how removable carrier casing 500 and winch casing 600 will be enjoined together in a way that will be easy for an individual to tow ladder hoist 400 in its entirety. Handle insert 421, upper insert 423, and lower insert 425 are used together to secure the two casings together. It is important that an individual will be able to swiftly and efficiently set up this equipment which is why winch casing 600 is designed to be easily disengaged from removable carrier casing 500. This allows the user to slide winch casing 600 off of carrier casing 500 so the user can then install alternative building ladder hoist 400 on a building ladder and removable carrier casing 500 and straps are out of the way.

Figure 22:
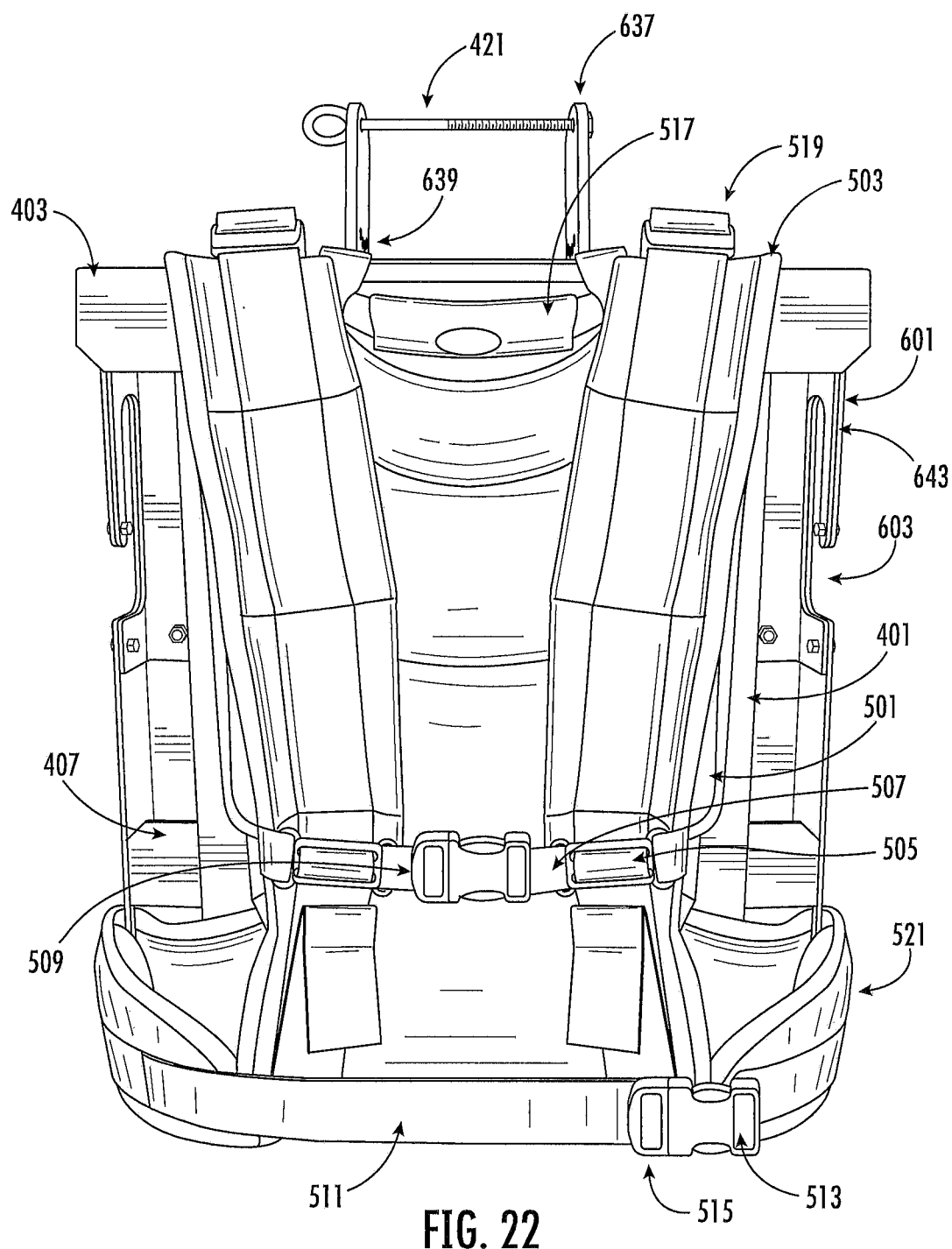
FIG. 22 is a back view of the alternative embodiment of the building ladder hoist from FIG. 21, according to the present application.

Referring now to FIG. 22 in the drawings, the back of ladder hoist 400 is illustrated. As shown in FIG. 22, ladder hoist 400 further comprises padded back 501, padded replaceable straps 503, lower adjustment tabs 505, strap buckle housing 507, strap buckle insert 509, security strap 511, security strap buckle housing 513, strap buckle insert 515, padded handle 517, upper adjustment tabs 519, and security strap pads 521. FIG. 22 also provides a back view of back wall 401, top plate 403, bottom plate 407, handle insert 421, side plate 601, upper groove 603, handle plates 637, lower adjustment holes 639, and side support plate 601.

Padded back 501 is attached directly to back wall 401. Padded back 501 supports the user while they are wearing the carrier and makes it easier for them to carry it around for longer periods of time. Padded back 501 is secured to back wall 401 by back cushion fasteners 413 which can be seen in FIGS. 26 and 27. Connected to the top of padded back 501 are two padded replaceable straps 503 which are attached to the upper left and right side of padded back 501. Padded straps 503 allow the user to carry ladder hoist 400 on their shoulders which will let users carry it for longer periods and experience less fatigue. Also, straps 503 being replaceable will allow the user to change them out if they become worn down or if the user desires straps that have more cushion. Padded replaceable straps 503 can also be tightened to fit the body of the user by using lower adjustment tab 505 and upper adjustment tab 519. The adjustment tabs use the extra lengths of the straps to either make straps 503 tighter or looser on the user which will allow the user to set it to where it fits best on them so it's secured and comfortable. Found at the top of padded back 501 is padded handle 517 which allows the user to carry ladder hoist 400 in the hand instead of having it strapped to their back.

Strap buckle housing 507 is found on the right padded strap 503 when looking at the back of building ladder hoist 100 and strap buckle insert 509 is on the left padded strap 503. Buckle insert 509 will be inserted into buckle housing 507 to secure the two padded straps 503 together. When secured in this fashion, the straps will not be able to slide off the user during movement. Security strap 511 provides a strap which holds the wide padded backpack straps up in place and keeps them high and tight and out of the way so they don't drag the ground or get damaged when not in use, storing, or towing ladder hoist 400. Security strap 511 is attached to back walls 501 by security strap fasteners 415 which can be seen in FIGS. 26 and 27. Strap 511 buckles over padded straps 503 when securing the straps to the carrier using security strap buckle housing 513 and security strap buckle insert 515. Attached at both sides at the bottom of padded support 501 are security strap pads 521 which extend out from the sides of padded support 501 and provide padding where security strap 511 would run so that way the user will not feel the strap directly against them.

Figure 23:
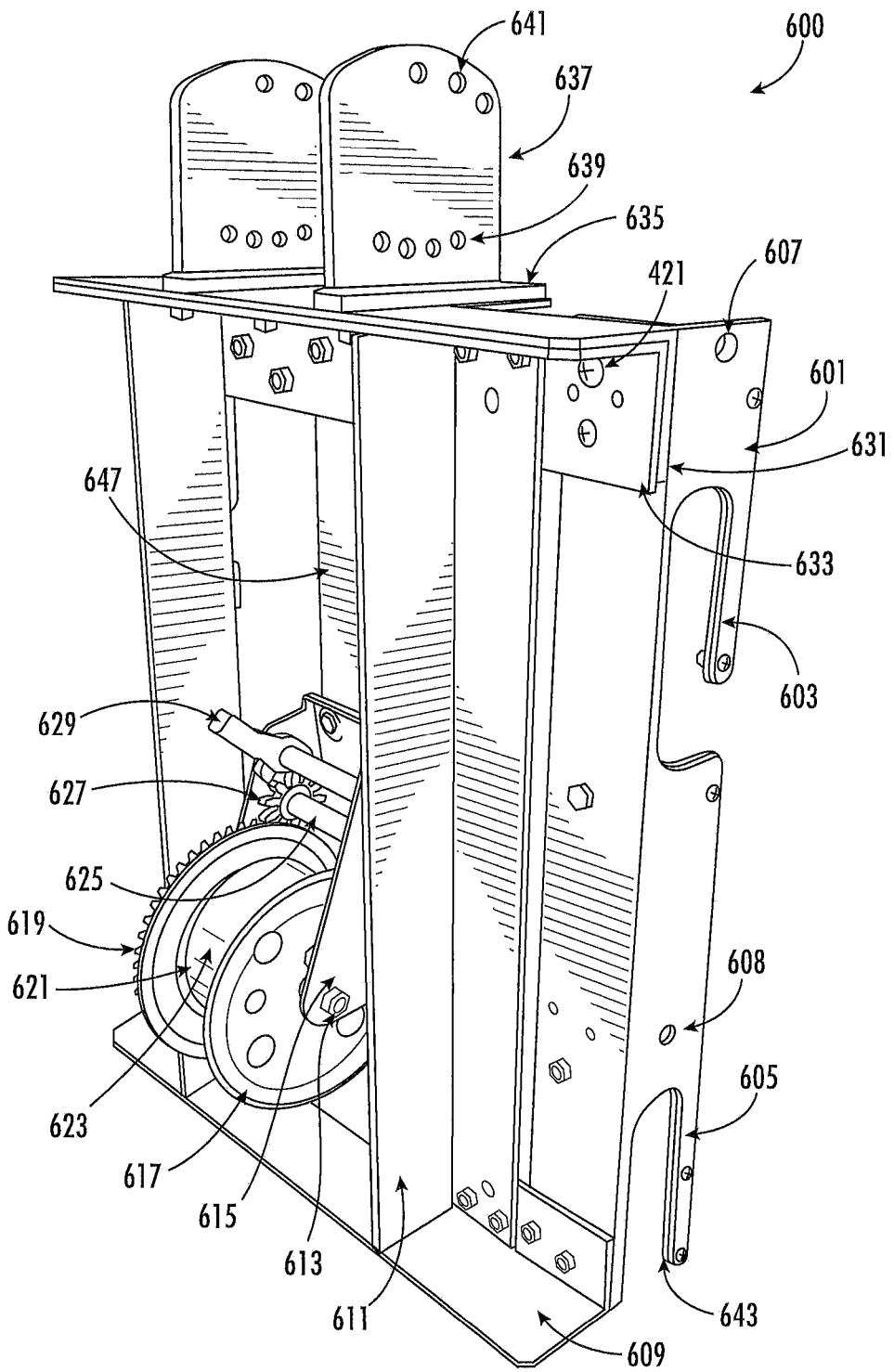
FIG. 23 is a perspective right side view of the alternative embodiment of the winch casing of FIG. 21, according to the present application.
Figure 24:
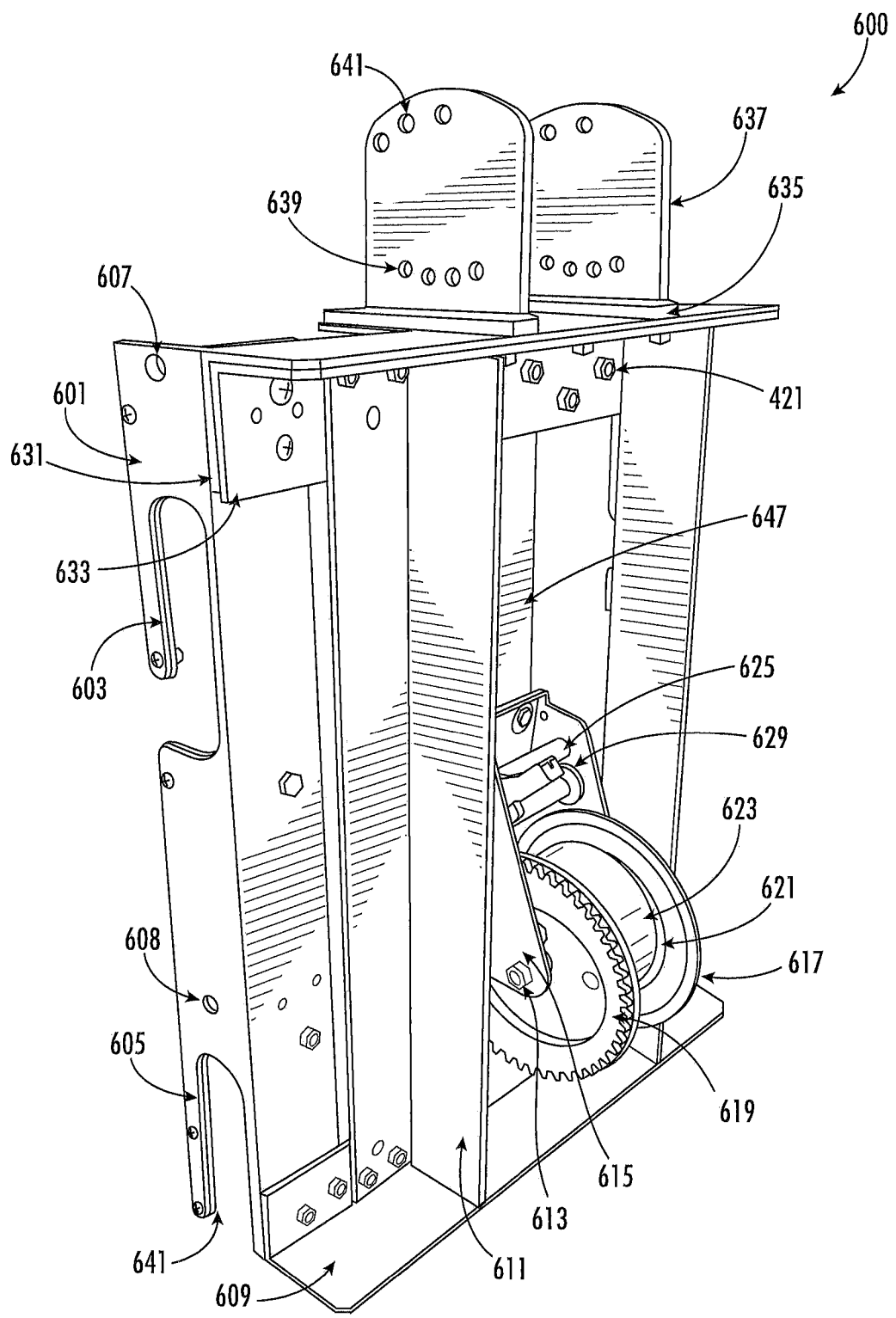
FIG. 24 is a perspective left side view of the alternative embodiment of the winch casing of FIG. 21, according to the present application.

Referring now to FIGS. 23 and 24 in the drawings, the sides of winch casing 600 with the telescopic winch boom 647 in the retracted position is depicted. These side views show that winch casing 600 comprises fasteners 421, side plate 601, upper groove 603, lower groove 605, upper insert hole 607, lower insert hole 608, bottom plate 609, side walls 611, winch axle fastener 613, winch base 615, winch outer plate 617, winch main gear 619, winch axle 621, winch strap 623, winch support bar 625, inner winch gear 627, rotational security bar 629, upper top plate 631, lower top plate 633, handle plate supports 635, handle plates 637, lower adjustment holes 639, upper adjustment holes 641, and side support plate 643.

Winch casing 600 is rectangular in shape and is formed by side plates 601, base plate 609, side walls 611, upper top plate 631 and lower top plate 633. The walls and plates of winch casing 600 may be made out of metal, wood, plastic, or any other light weight sturdy material. Being light weight, in combination with being hollow, allows winch casing 600 to be as light as possible to make it easy for individuals to carry ladder hoist 400 with them. Side plate 601 is L-shaped with one end protruding out from the back of ladder hoist 400. Base plate 609 is also L-shaped and connects to the front of the bottom of side plate 601 and connects to the back of the bottom of side wall 611. Upper top plate 631 is L-shaped and connects to the top front of side plate 601 and lower top plate 633 is also L-shaped and connects to the front of upper top plate 631 so that the top plates are stacked on top of each other to add extra support and stability for winch casing 600 when the winch is in use. Side wall 611 is L-shaped and is next to side plate 601 and extends up from bottom plate 609 up to lower top plate 633. All of these plates and walls may be connected to each other either through general fasteners 421, or by being welded together.

The section of side plate 601 which protrudes out from the back of winch casing 600 has two grooves, upper groove 603 and lower groove 605. Upper groove 603 is nonlinear in shape and extends inward from the side of side plate 601 before extending upward. Lower groove 605 starts at the bottom of side plate 301 and extends upward before ending. These grooves are used to allow the user to have and quick and easy way to secure winch casing 600 to a ladder. The reason that upper groove 603 has its nonlinear shape is that it the notches will catch onto the ladder which will prevent winch casing 600 from coming undone during the process. At the groove locations on side plate 601, there is also side support plate 643 which has the same shape as the grooves on it and is connected to side plate 601 to provide extra support for the casing when in use. Found above upper groove 603 there is upper insert hole 607 and above lower groove there is lower insert hole 608. Also, when winch casing 600 and removable carrier casing 500 are together, upper insert 423 will be inserted through insert hole 607 and lower insert 425 will be inserted through insert hole 608 in order to secure these two casings together.

FIGS. 23 and 24 also provide a look at the winch system when it is not in use on winch casing 600. Connecting to the inside walls of side walls 611 is winch base 615. Between the two sides of winch base 615 are support bars 625 which provide extra support for the whole system in order to keep it in place. Winch base 615 is C-shaped with the bottom edge extending further out then the upper edge. Rotational security bar 629 is connected to right side of winch base 615. Rotational security bar 629 is mostly flat with a tab protruding out from the end of it which the user will pull on to us it. Security bar 629 is designed so that a user will be able to pull on the bar in order to stop the gears inside the winch from turning in case the user wants to keep the item they are hoisting in place or if they lose control of the winch and need to stop it. Security bar 629 is connected to a support bar between winch base 615 and has a small protrusion sticking out it and pointing in towards the gears of the winch. By pulling on rotational security bar 629, the protrusion will catch on inner winch gear which 627 which will prevent it from turning. By pulling on security bar 629, the hoist will operate down, and when pushed the hoist will operate up.

The winch system is between winch base 615 and connecting both sides of this base is winch axle 621 which is connected to the base by axle fastener 613. Attached to the ends of winch axle 621 but in-between the two sides of winch base 515 are two winch outer plates 617. Axle fastener 613 extends through both outer plates 617 and through axle 621 to secure the winch system to winch base 615. On the outer side of the left out plate 617 there is winch main gear 619 which is the main gear that moves winch strap 623. Winch strap 623 is stored by being wrapped around winch axle 621 when not in use and then winch main gear 619 is turned in order release and lower winch strap 623. Connected to the top of upper top plate 631 are two handle plate supports 635 which extend upward into handle plates 637. Handle plates 637 are rectangular in shape and end with a curved portion. At the top of handle plates 637 there are three upper adjustment holes 641 and at the bottom there are four lower adjustment holes 639. Pin 671, which can be seen in FIG. 28, can be inserted into one of these holes to adjust the angle that boom 647 will sit at when in use while also keeping it locked in place there.

Figure 25:
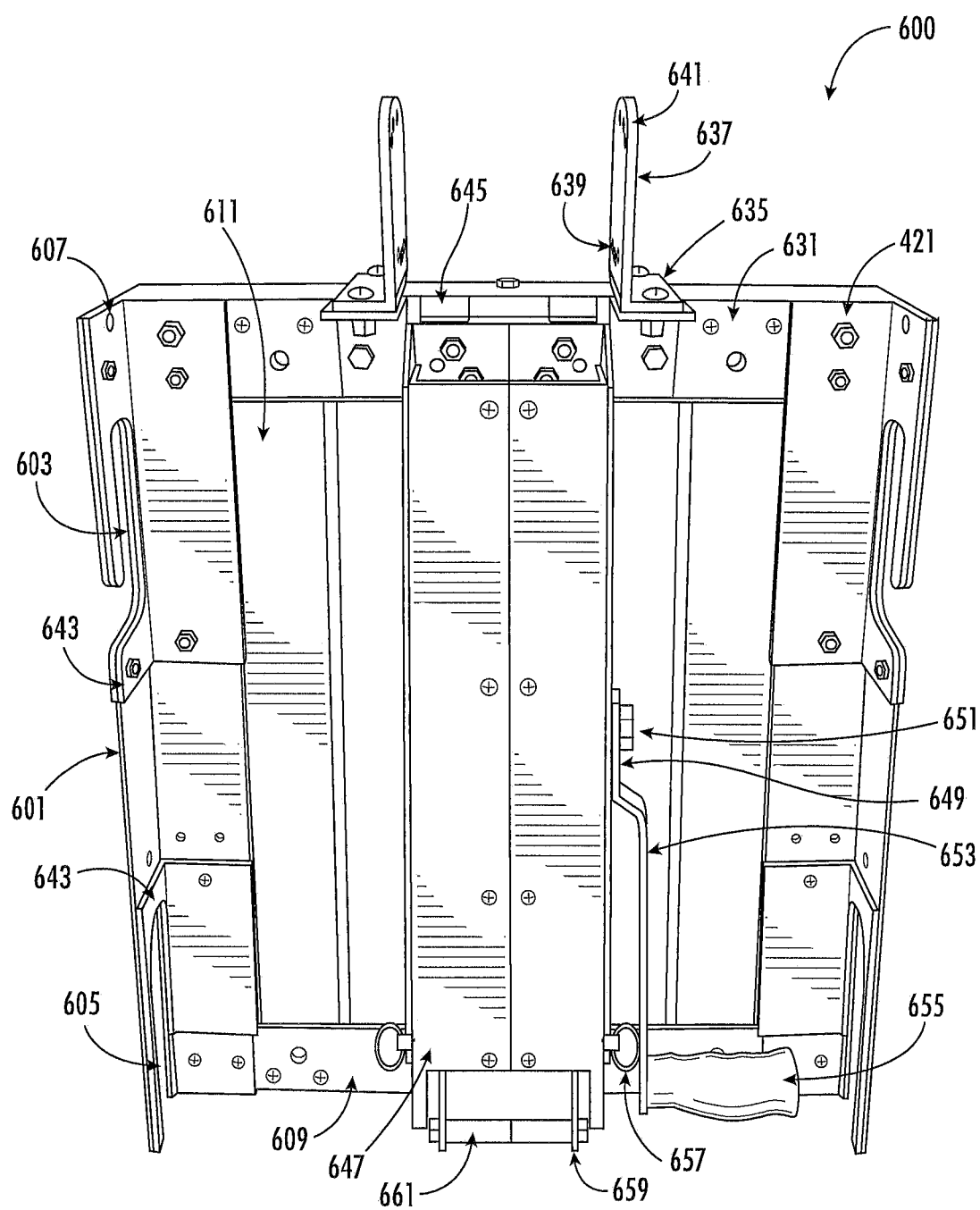
FIG. 25 is a back view of the alternative embodiment of the winch casing of FIG. 21, according to the present application.

Referring now to FIG. 25 in the drawings, the back of winch casing 600 is depicted. Along with what was shown in FIGS. 23 and 24, FIG. 25 shows that winch casing further comprises a hinge 645, an adjustable boom 647, a winch handle base 649, a winch handle fastener 651, a winch handle bar 653, a winch handle grip 655, fastener pins 657, a winch strap edge support 659, and a winch strap edge axle 661. Hinge 645 is connected to the back of upper top plate 631 and allows for adjustable boom 647 to be pulled up into position. Adjustable boom 647 is a rectangular hollow telescoping structure that is used with the wench to hoist items up. Adjustable boom 647 has extra length stored inside of it and the user can extend the length of boom 647 by removing pins 657 from the side of boom 647 then inserting them back in once a desired length has been met. Winch base 615 is attached to the top of boom 647 and FIG. 25 shows that on one side of winch base 615 there is the handle system used to turn the gears and work the wench. This handle system is comprised of the winch handle base 649 which is square in shape and is fastened to the side of winch base 615 by fastener 651. Handle base 649 then curves up at an angle before straightening out again to form winch handle bar 653 which extends out before ending in a curved edge. Winch handle grip 655 is attached perpendicular to the end of handle bar 653 and provides a location for the user to crank the handle system to work the winch. At the very end of boom 647 there is winch strap edge support 659 which is two prongs that extend out from the end of boom 647 and winch strap edge axle 661 spans the gap between these two prongs. Edge support 659 and axle 661 are used as a pulley system with winch strap 623 to make it easier for the winch system to hoist items so that way the user does not have use as much effort to lift heavy objects.

Figure 26:
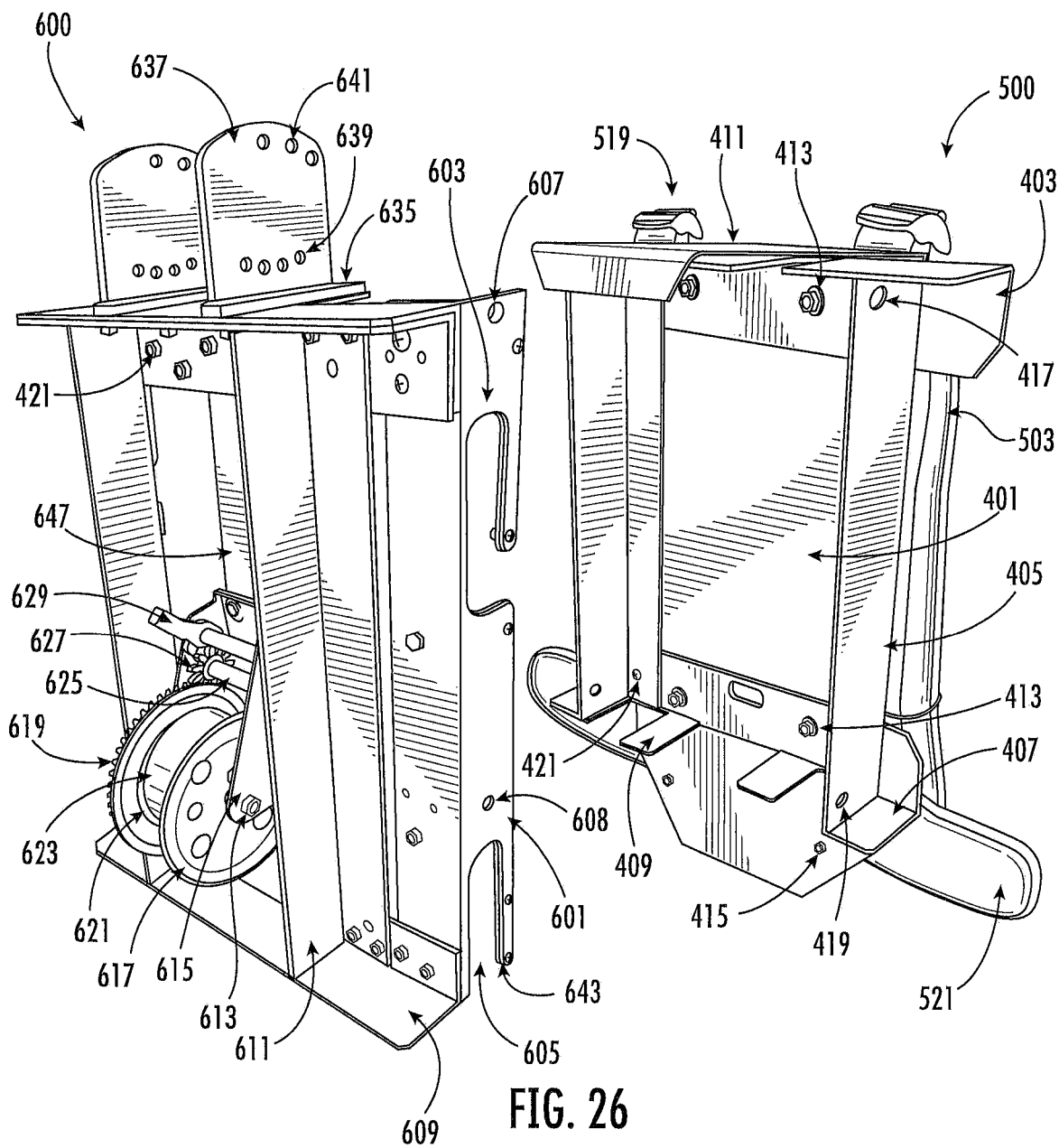
FIG. 26 is a perspective right side view of the alternative embodiment of the building ladder hoist from FIG. 21, according to the present application.

Referring now to FIG. 26 in the drawings, a perspective view of the carrier casing 500 and winch casing 600 when not connected is depicted. FIG. 26 shows the general orientation of these two casings in relation to each other. One of the main functions of these two casings is to be easily removed from each other for quick work and FIG. 26 shows the orientation between them normally.

Figure 27:
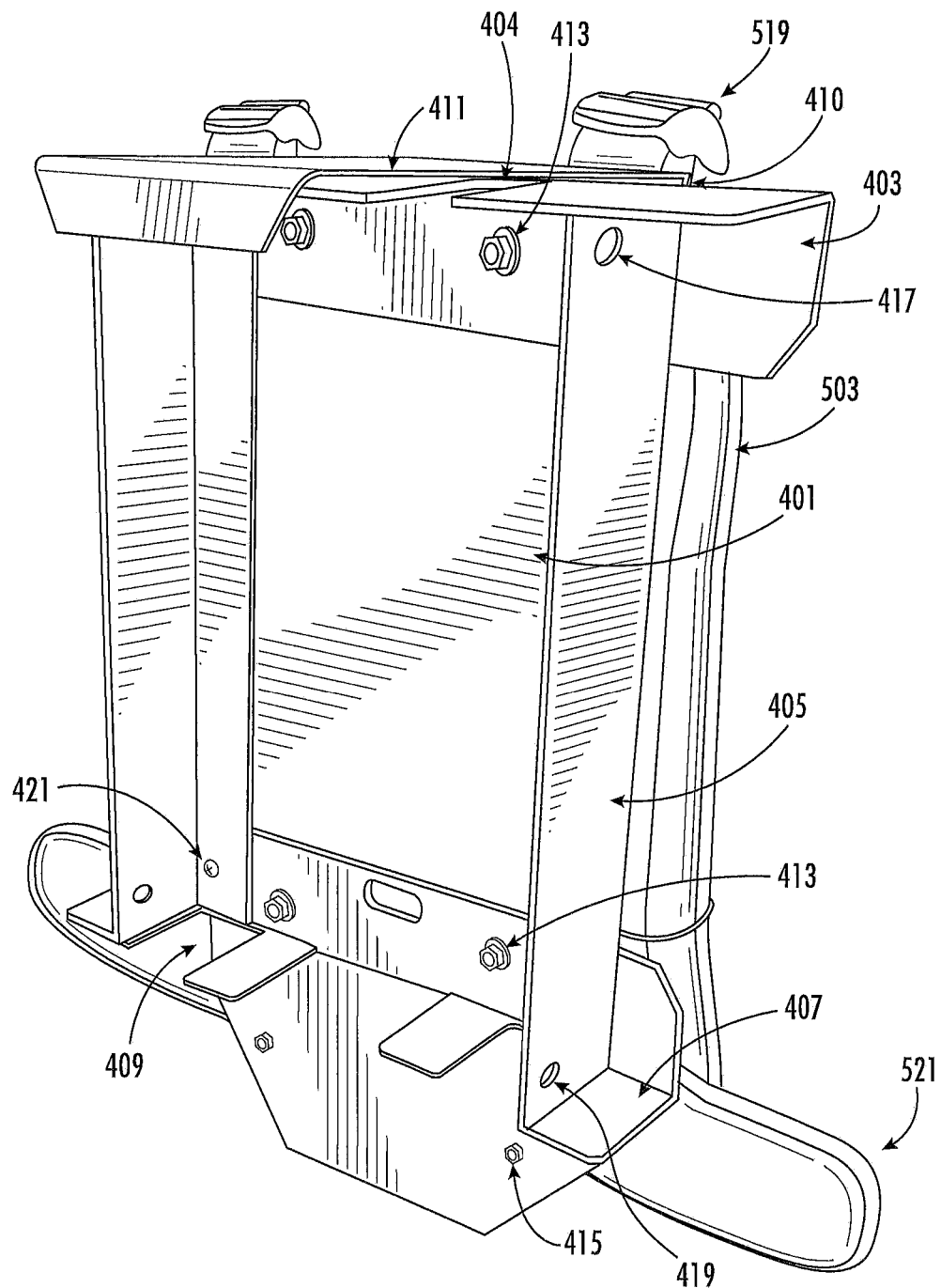
FIG. 27 is a perspective right side view of the alternative embodiment of the removable carrier/casing from FIG. 21, according to the present application.

Referring now to FIG. 27 in the drawings, a perspective view of carrier casing 500 is depicted. Carrier casing 500 is shown to be comprised of a back wall 401, top portion 403, top grooves 404, a pair of side walls 405, a bottom portion 407, bottom grooves 409, top plate hinge 410, top plate 411, top plate grooves 412, back cushion fashioners 413, security strap fasteners 415, upper insert hole 417, lower insert hole 419, and general fasteners 421. The walls and plates of carrier casing 500 may be made out of metal, wood, plastic, or any other light weight sturdy material. Being light weight, in combination with being hollow, allows winch casing 500 to be as light as possible to make it easy for individuals to carry ladder hoist 400 with them. All of these plates and walls may be connected to each other either through general fasteners 421, or by being welded together.

Back wall 401 forms the main structure of carrier casing 500 and is rectangular in shape but has a segmented bottom that is comprised of three straight portions. Attached to the front and top of back wall 401 is top portion 403 which is L-shaped. Top portion 403 extends the entire width of back wall 401 along with extending out from the sides of back wall 401. Part of top portion 403 protrudes out from the front of back wall 401 and that protruding portion contains two grooves 404 which allow handle plates 637 to fit into top portion 403. Attached to the front and the bottom of back wall 401 is bottom portion 407 which is also L-shaped. Bottom portion 407 also extends the width of back wall 401 as well as extending out from the sides of back wall 401. The section of bottom portion 407 which protrudes out from back wall 401 has three bottom grooves 409 instead of the two in top portion and these grooves align with boom 647 and the side walls 611. The grooves located at the top and bottom section of carrier casing 500 help secure the components of winch casing 600 in place so that way during movement there will be a less likely chance of the parts becoming damaged. Extending between top portion 403 and bottom portion 407 are side walls 405 which is a rectangular plate which extends the full length between them to help with support.

Attached to the top of top portion 403 is top plate 411. Top plate 411 is connected to top portion 403 by hinge 410 which allows for top plate 411 to be moved up and down at will. The reason for this is that top plate 411 has two grooves 412 in it that are aligned with handle plates 637. So handle plates 637 will be inserted into place before handle insert 421 is place into one of adjustment holes in it and it will work as another way of securing wench casing 600 to carrier casing 500. Side wall 405 further has upper insert hole 417 and lower insert hole 419 which, when connected with winch casing 600, coincide with the insert holes found there and once the inserts are placed in these two casings will be securely connected.

Figure 28:
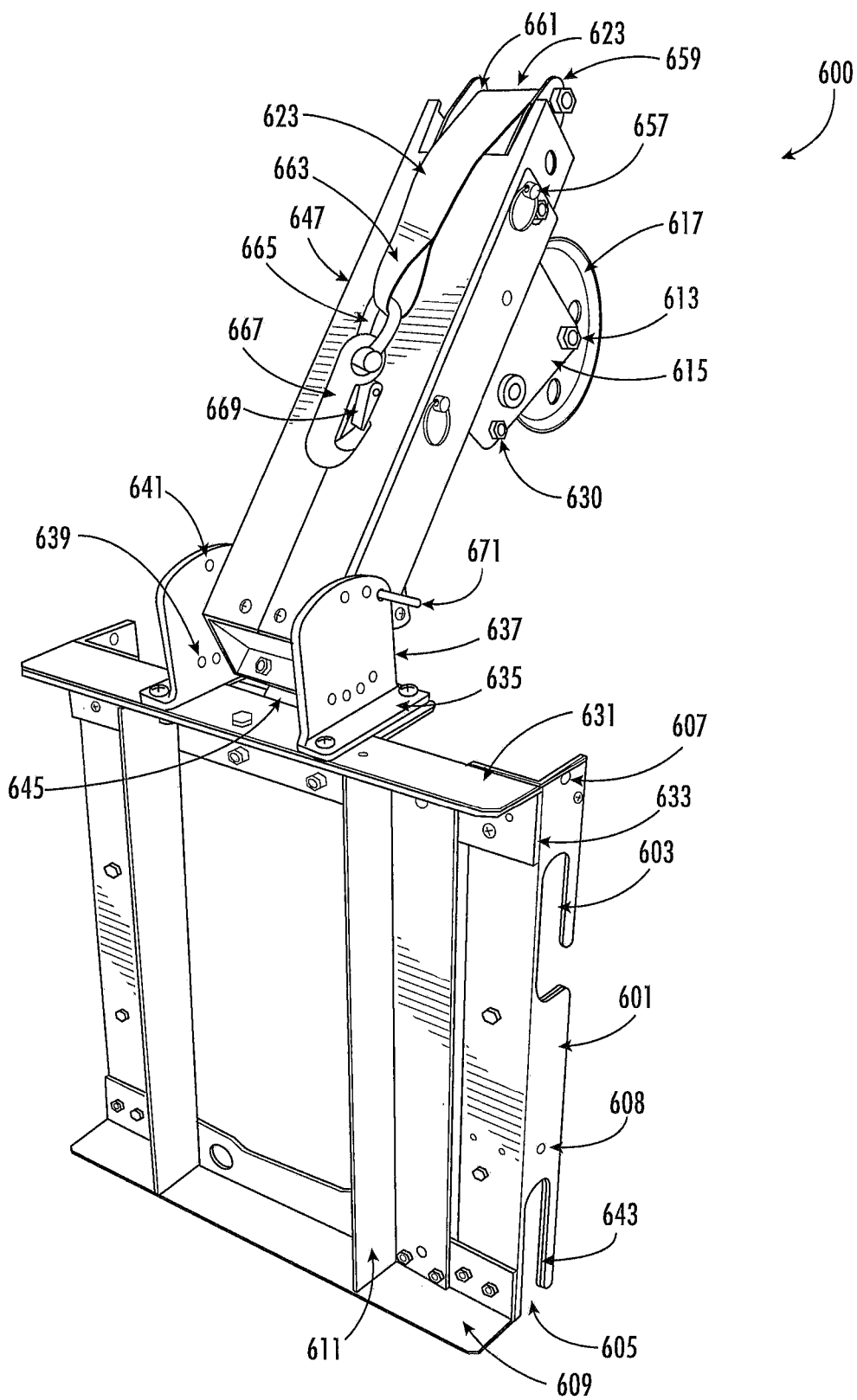
FIG. 28 is a perspective right side view of the alternative embodiment of the winch casing from FIG. 21, according to the present application.
Figure 29:
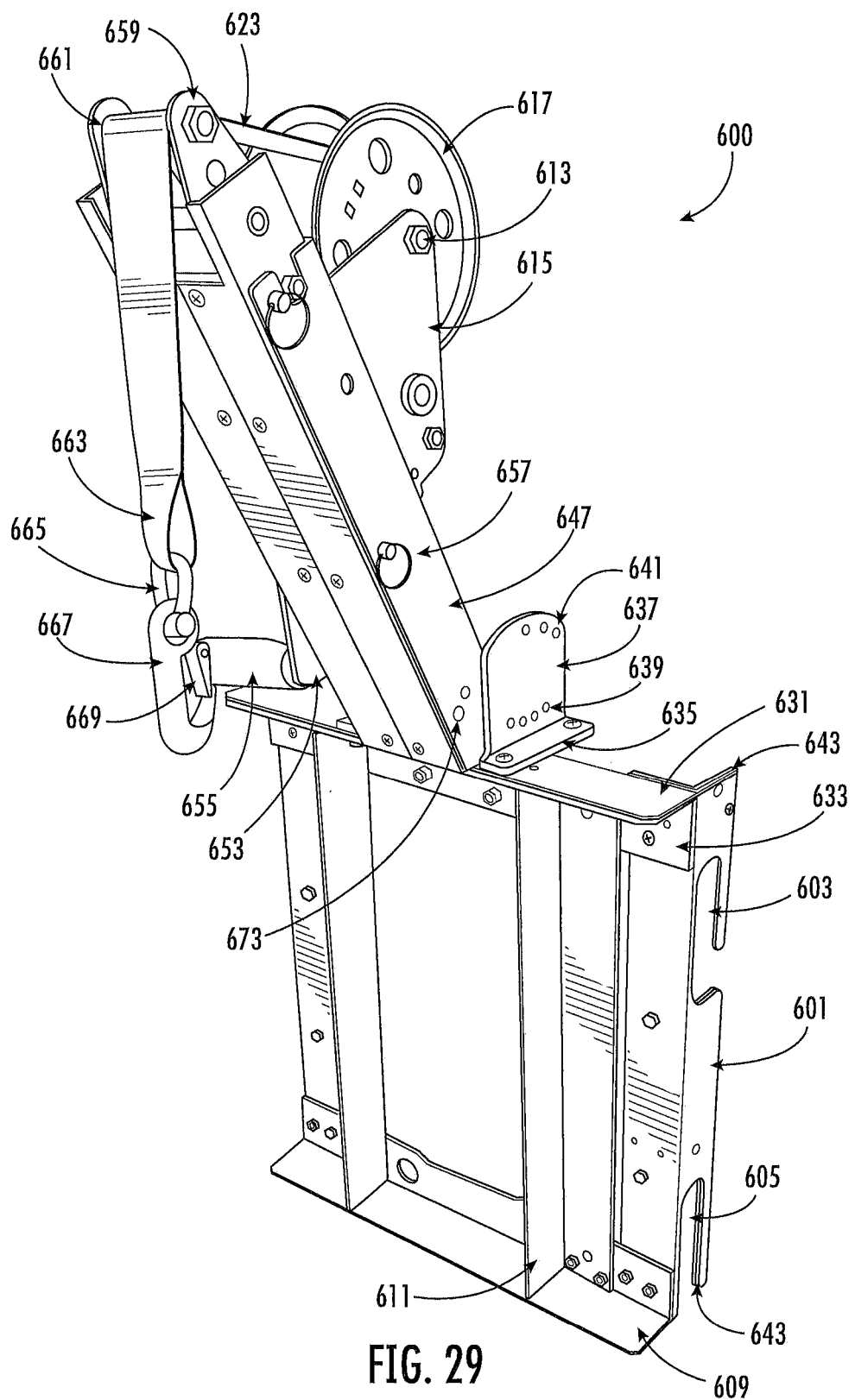
FIG. 29 is a perspective right side view of the alternative embodiment of the winch casing from FIG. 21, according to the present application.

Referring now to FIGS. 28 and 29 in the drawings, a perspective view of winch casing 600 with boom 647 deployed is shown. Along with what was shown in previous figures, winch casing 600 is shown to comprise winch strap loop 663, connecting hook 665, hoist hook 667, latch 669, pin 671, and boom holes 673. The hook system seen here works in the same way as the hook system in the previous embodiment. Pin 671 is just a straight piece of metal which is used in the system by being inserted through handle plates 637 to either have boom 647 rest on it or being inserted through holes 673 found there on the boom to secure it in place.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered, modified and/or combined, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

What is claimed is:

1. A ladder hoist comprising:
   a removable carrier casing comprising:
   at least one pair of opposing side walls; and
   a top plate connecting a top of the at least one pair of opposing side walls;
   a winch casing comprising:
   at least one pair of opposing end walls;
   a top plate connecting a top of the at least one pair of opposing end walls;
   a base connecting a bottom of the at least one pair of opposing end walls;
   at least one pair of opposing side plates secured to an exterior surface of the at least one pair of opposing end walls;
   at least one groove disposed within the at least one pair of opposing side plates, the at least one groove oriented such that the winch casing can be slotted onto an external surface; and
   a winch positioned between the at least one pair of opposing end walls; and
   at least one fastener pin securing the removable carrier casing and the winch casing together.

2. The ladder hoist of claim 1, wherein the at least one pair of opposing side walls and the top portion of the removable carrier casing are nonlinear.

3. The ladder hoist of claim 1, wherein the base of the winch casing is nonlinear.

4. The ladder hoist of claim 1, wherein at least one pair of opposing end walls of the winch casing are nonlinear.

5. The ladder hoist of claim 1, wherein the removable carrier casing further comprises a dolly.

6. The ladder hoist of claim 5, wherein the dolly further comprises:
- a pair of opposing straight end walls connected to a front of the at least one pair of opposing side walls;
- a straight back wall extending between a back of the pair of opposing straight end walls;
- a segmented front wall extending between a front of the pair of opposing straight end walls;
- a pair of side supports connecting an exterior surface of the pair of opposing straight end walls to an exterior surface of at least one pair of opposing side walls;
- at least one support box for supporting the winch casing when carried by the removable carrier casing; and
- at least one support tab for maintaining the removable carrier casing in the upright position when not in motion.

7. The ladder hoist of claim 1, wherein the removable carrier casing further comprises:
- a padded handle;
- a padded back coupled to a back of the at least one pair of opposing side walls;
- at least one support strap fastened to a top of the padded back;
- at least one upper strap adjustment tab for adjusting the length of the at least one support strap; and
- a security strap coupled to a side of the at least one pair of side walls, the security strap securing the at least one support strap in place during movement.

8. The ladder hoist of claim 7, wherein the at least one support strap is replaceable.

9. The ladder hoist of claim 1, wherein the removable carrier casing further comprises:
- a tow handle;
- at least one wheel attached to the exterior surface of the at least one pair of opposing side walls; and
- at least one back wall support extending between the at least one pair of opposing side walls, the at least one back wall support sized to receive the winch casing.

10. The ladder hoist of claim 9, wherein the at least one back wall support has a slot through it.

11. The ladder hoist of claim 9, wherein the tow handle further comprises:
- at least one pair of opposing handle bars extending up from a top of the removable carrier casing;
- a handle disposed between the at least one pair of opposing handle bars;
- at least one handle support plate securing the handle between the at least one pair of opposing handle bars; and
- at least one handle bar stopper disposed through a bottom of the at least one pair of opposing handle bars, the at least one handle bar stopper sized to prevent the at least one pair of opposing handle bars from being pulled out the top of the removable carrier casing.

12. The ladder hoist of claim 1, wherein the top portion of the winch casing is comprised of two separate plates.

13. The ladder hoist of claim 1, wherein the winch casing further comprises:
- a winch support base disposed between the pair of opposing end walls;
- a retractable boom carried within the winch support base;
- a winch strap operably associated with the retractable boom such that the retractable boom extends the range distance that the winch strap extends from the winch casing;
- a hook coupled to an end of the winch strap, the hook sized to secure an external object to winch strap to be lifted by the winch.

14. The ladder hoist of claim 13, wherein the winch further comprises:
- an axle disposed within the winch support base;
- at least one winch main gear carried by the axle and operably associated with the winch strap, such that when the axle is rotated, the at least one winch main gear will also rotate lowering or raising the winch strap;
- at least on security bar operable associated with the axle, such that pulling down on the at least one security bar will halt rotation of the axle; and
- a removable handle disposed on the winch support base for rotating the axle;
- wherein the winch strap is wrapped around the axle when not in use.

15. The ladder hoist of claim 13, wherein the retractable boom has an adjustable length.

16. The ladder hoist of claim 13, wherein the winch casing further comprises at least one protruding plate at the top.

* * * * *